(12) United States Patent
Xiong et al.

(10) Patent No.: US 8,369,347 B2
(45) Date of Patent: Feb. 5, 2013

(54) FIBER CHANNEL OVER ETHERNET AND FIBER CHANNEL SWITCHING BASED ON ETHERNET SWITCH FABRICS

(75) Inventors: Yijun Xiong, Plano, TX (US); Jinshui Liu, Plano, TX (US); Cheng Gang, Richardson, TX (US); Laijun Zhong, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 441 days.

(21) Appl. No.: 12/559,194

(22) Filed: Sep. 14, 2009

(65) Prior Publication Data

US 2011/0064086 A1  Mar. 17, 2011

(51) Int. Cl.
*H04L 12/56* (2006.01)
(52) U.S. Cl. .................. 370/401; 370/466; 709/236
(58) Field of Classification Search .................. None
See application file for complete search history.

(56) References Cited

U.S. PATENT DOCUMENTS

| | | | | |
|---|---|---|---|---|
| 7,827,327 | B1 * | 11/2010 | Thorpe et al. | 710/36 |
| 2008/0056300 | A1 * | 3/2008 | Williams | 370/466 |
| 2008/0317013 | A1 | 12/2008 | Bryans | |
| 2009/0245791 | A1 * | 10/2009 | Thaler et al. | 398/45 |
| 2009/0303990 | A1 * | 12/2009 | Ambrose et al. | 370/389 |
| 2010/0061383 | A1 * | 3/2010 | Rupanagunta et al. | 370/401 |
| 2010/0104280 | A1 * | 4/2010 | Carlson et al. | 398/45 |
| 2010/0115132 | A1 * | 5/2010 | Hirata et al. | 709/245 |
| 2010/0208730 | A1 * | 8/2010 | Henderson et al. | 370/389 |
| 2011/0051733 | A1 * | 3/2011 | Hirata | 370/400 |
| 2011/0058573 | A1 * | 3/2011 | Balakavi et al. | 370/463 |

OTHER PUBLICATIONS

"Fibre Channel Backbone," (FC-BB-5), INCITS T11 Committee, Rev. 1.01, Jun. 10, 2008.
"Fibre Channel Framing and Signaling," (FC-FS-3), INCITS T11 Committee, Rev. 0.50, Jun. 13, 2008.
"Fibre Channel Switch Fabric," (FC-SW-5), INCITS T11 Committee, Rev. 8.0, Nov. 22, 2008.
"Cisco Nexus 5000 Series Architecture: The Building Blocks of the Unified Fabric," Cisco White Paper, 2008.
"BrideX™ Silicon 10/20/40Gb/s InfiniBand to 10 GigE and 2/4/8Gb/s FC Gateway," Mellanox Product Brief, 3076PB Rev. 1.0.
"Fibre Channel Link Services," (FC-LS-2), INCITS T11 Committee, Rev. 2.00, Jun. 26, 2008.

* cited by examiner

*Primary Examiner* — Hassan Phillips
*Assistant Examiner* — Duc Duong
(74) *Attorney, Agent, or Firm* — Conley Rose, P.C.; Grant Rodolph; Rayhao Chung

(57) ABSTRACT

An apparatus comprising a Converged Port Controller (CPC) comprising a plurality of first ports and a plurality of second ports, and an Ethernet Switch Fabric (ESF) coupled to the second ports, wherein the CPC is configured to receive a plurality of Fiber Channel over Ethernet (FCoE) frames on the first ports, modify at least some of the FCoE frames, thereby producing modified FCoE frames, and transmit the FCoE frames on the second ports. An apparatus comprising at least one processor configured to implement a method comprising receiving a plurality of FCoE frames, a plurality of Fiber Channel (FC) frames, and a plurality of Ethernet frames, modifying the FCoE frames, thereby producing modified FCoE frames, encapsulating the FC frames in an Ethernet format, thereby producing a plurality of second FCoE frames, and switching the modified FCoE frames, the second FCoE frames, and the Ethernet frames using an Ethernet switch fabric.

25 Claims, 22 Drawing Sheets

FIBER CHANNEL OVER ETHERNET AND FIBER CHANNEL SWITCHING BASED ON ETHERNET SWITCH FABRICS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Fiber Channel over Ethernet (FCoE) is a technology used for transporting Fiber Channel (FC) frames over Ethernet, which is currently being standardized at the Technical Committee for Fiber Channel (T11) of the International Committee for Information Technology Standards (INCITS). The transported FC frames are used based on an FC architecture for storage networking purposes. The FCoE technology replaces the FC physical (FC-0) and FC coding (FC-1) layers of the FC architecture with the Ethernet physical and Media Access Control (MAC) layers of the Ethernet architecture without altering the FC framing (FC-2) layer and higher layers. Using the FCoE technology, the FC frames and standard Ethernet frames can be transported independently in the network. Accordingly, the FC frames are mapped over Ethernet frames and then transmitted on Ethernet links, which provides substantially seamless integration between FC based networks and Ethernet based networks. The FCoE technology can be used for server Input/Output (I/O) consolidation for FC-based storage area networks (SANs), which are widely used in enterprise data centers, and potentially for establishing a unified network infrastructure for data centers based on Ethernet.

A plurality of FCoE switch architectures have been introduced to implement FC switching functions and Ethernet bridging functions and to support an FCoE Initialization Protocol (FIP) according to Rev 1.01 for Fiber Channel Backbone (FC-BB-5) of the INCITS T11, published Jun. 10, 2008, which is incorporated herein as if reproduced by its entirety. In one architecture, an FCoE switch, also referred to as an FC Forwarder (FCF), comprises a plurality of components interconnected via a crossbar with centralized arbitration. For instance, the FCoE switch may be configured as described in a white paper by Cisco published 2008 and entitled "Cisco Nexus 5000 Series Architecture: The Building Blocks of the Unified Fabric," which is incorporated herein by reference as if reproduced by its entirety. In another architecture, an FCoE switch comprises an Ethernet switch configured with built-in FC forwarding functions. For instance, the FCoE switch may be configured in N_Port Virtualizer (NPV) mode as described in Mellanox Product Brief, 3076PB Rev 1.0, entitled "BridgeX™ Silicon 10/20/40 Gb/s InfiniBand to 10 GigE and 2/4/8 Gb/s FC Gateway," which is incorporated herein by reference as if reproduced in its entirety. In any event, the FCoE switch may comprise a plurality of FCoE ports that support standard Ethernet frames and Ethernet-encapsulated FC frames, which may be referred to as FCoE frames and identified by an Ethertype in the frame header. The FCoE switch may also comprise a plurality of FC ports that supports native FC frames.

Typically, the standard Ethernet frames may be received on an FCoE port and then forwarded according to the Institute of Electrical and Electronics Engineers (IEEE) 802 Ethernet standard. Further, the FCoE frames may be received on the FCoE port, de-capsulated to obtain the FC frames, and then forwarded, for instance according to Rev 0.50 for Fiber Channel Framing and Signaling (FC-FS-3) of the INCITS T11, published Jun. 13, 2008, and/or Rev 8.0 for Fiber Channel Switch Fabric (FC-SW-5) of the INCITS T11, published Nov. 22, 2008, both of which are incorporated herein as if reproduced by their entirety. The FC frame received from an FCoE port and de-capsulated may also be encapsulated in an Ethernet frame and forwarded to another FCoE port.

The FCoE architectures described above may be based on new chip designs and may not make use of existing Ethernet switches. As such, they require replacing or modifying some of the currently used network components. Further, combining available existing Ethernet-to-FC bridge chips with Ethernet switches to support FC ports and obtain FCoE switches may be exceedingly difficult.

SUMMARY

In one embodiment, the disclosure includes an apparatus comprising a Converged Port Controller (CPC) comprising a plurality of first ports and a plurality of second ports, and an Ethernet Switch Fabric (ESF) coupled to at least one of the second ports, wherein the CPC is configured to receive a plurality of FCoE frames on the first ports, modify at least some of the FCoE frames, thereby producing modified FCoE frames, and transmit the FCoE frames on the second ports.

In another embodiment, the disclosure includes an apparatus comprising at least one processor configured to implement a method comprising receiving a plurality of FCoE frames, a plurality of FC frames, and a plurality of Ethernet frames, modifying the FCoE frames, thereby producing modified FCoE frames, encapsulating the FC frames in an Ethernet format, thereby producing a plurality of second FCoE frames, and switching the modified FCoE frames, the second FCoE frames, and the Ethernet frames using an Ethernet switch fabric.

In yet another embodiment, the disclosure includes apparatus comprising a plurality of network facing ports, a plurality of server facing ports, and an Ethernet switch fabric coupled to the network facing ports and the server facing ports, wherein the server facing ports are configured to process a plurality of FCoE frames, a plurality of FC frames, and a plurality of Ethernet frames, and wherein the FCoE switch is configured to operate in an NPV mode.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are methods and systems for switching FCoE or FC frames using an FCoE switch architecture comprising a conventional ESF. The FCoE switch architecture may comprise at least one CPC coupled to the ESF. The CPC(s) may receive FC and/or FCoE frames, modify the FC and/or FCoE frames, and pass the modified FC and/or FCoE frames to the ESF. Specifically, when the received frames are FC frames, the CPC(s) may encapsulate the FC frames in an Ethernet frame, thereby producing an FCoE frame. Alternatively or additionally, when the received frames are FCoE frames, the CPC(s) may modify the FCoE frames, thereby producing a modified FCoE frame. In either case, the frames are switched by the ESF, and then returned to the CPC(s). On the egress side, the CPC(s) then remove the Ethernet framing from any encapsulated FC frames, thereby producing the original FC frames. Alternatively or additionally, the modified FCoE frames are unmodified, thereby producing the original FCoE frames.

Figure 1:
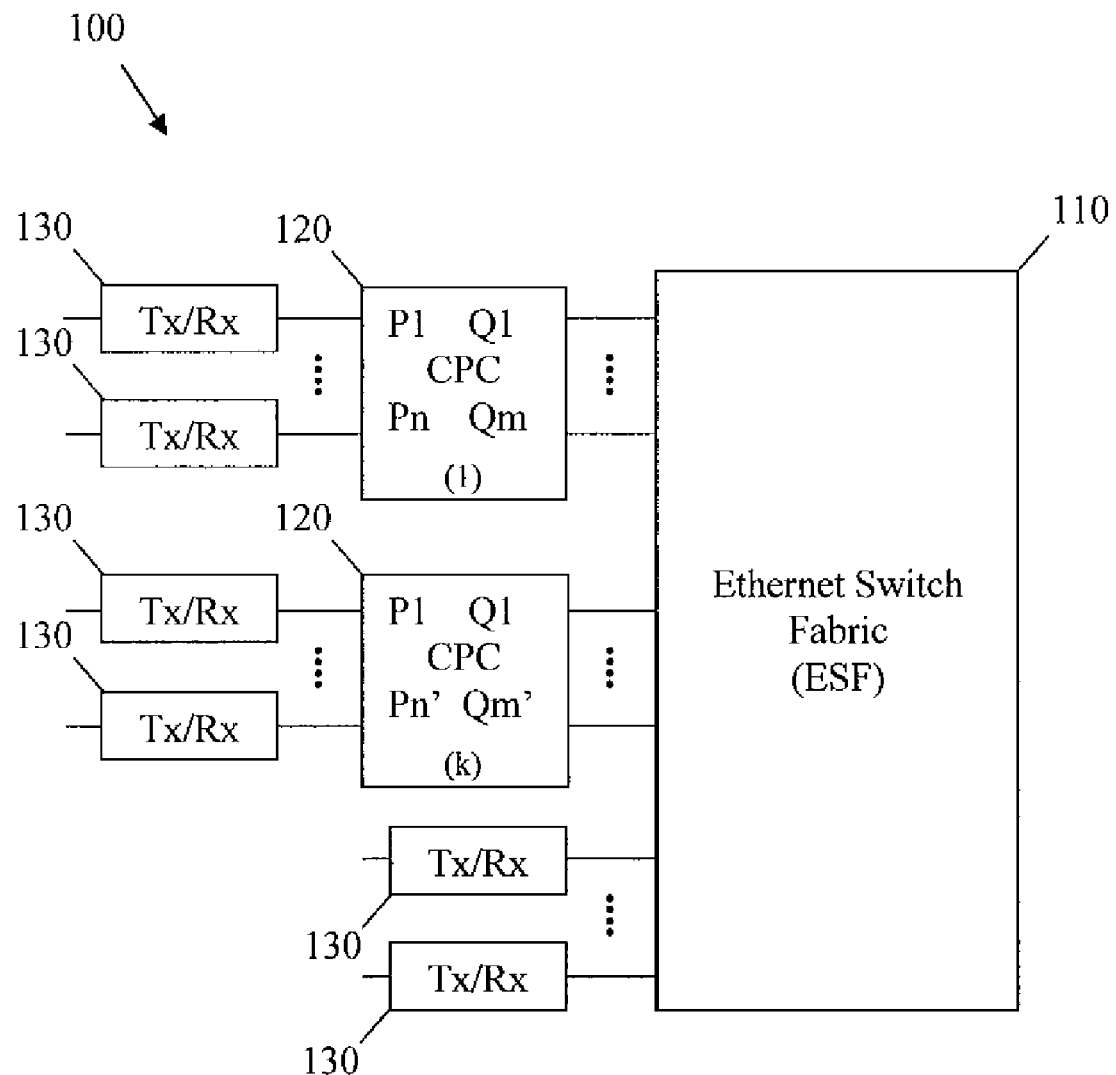
FIG. 1 is a schematic diagram of an embodiment of an FCoE switch architecture.

FIG. 1 illustrates one embodiment of an FCoE switch architecture 100, which may represent a high level design. As described below, the FCoE switch architecture 100 may be configured to support FC switching and Ethernet bridging functions independently, as well as transport FC frames and standard Ethernet frames. Additionally, the FCoE switch architecture may be configured to process FCoE frames, which may be Ethernet frames comprising encapsulated FC frames, and FIP frames. The FCoE switch architecture 100 may comprise an ESF 110, a plurality of CPCs 120, and a plurality of transmitters/receivers (Tx/Rx) 130. The CPCs 120 may be coupled to the ESF 110, and the Tx/Rxs 130 may be coupled to the CPCs 120 and/or the ESF 110 via a plurality of optical or electrical links.

The ESF 110 may be configured to transport standard Ethernet frames and support Ethernet bridging functions, such as those disclosed in the IEEE 802.1 and 802.3 series of standards, which are incorporated herein by reference as if reproduced in their entirety. Additionally, the ESF 110 may support: (1) lossless FCoE traffic forwarding; (2) multiple queues per port and per traffic priority queuing; and/or (3) Weighted Round-Robin (WRR) scheduling across its ports. In an embodiment, lossless FC traffic forwarding may be guaranteed via a PAUSE-frame or any other suitable flow control on the links between the ESF 110 and the CPCs 120. Further, the ESF 110 or the CPCs 120 may provide a priority-based flow control to support both FCoE and Ethernet traffic effectively. The ESF 110 may be a conventional ESF in that it does not support FCoE frame processing. The ESF 110 may be a single chip (as shown in FIG. 1), for instance in the case of relatively smaller FCoE switches. Alternatively, the ESF 110 may comprise a plurality of Ethernet chips and optionally other components, for instance in the case of larger FCoE switches.

The CPCs 120 may be coupled to the ESF 110 via at least one link and may be configured to process FCoE traffic, FC traffic, or both as described herein. Each of the CPCs 120 may comprise a first plurality of ports that are coupled to the ESF 110, which may be referred to as internal ports, and a second plurality of ports that are coupled to at least one of the Tx/Rxs 130, which may be referred to as front-panel ports. Further, different CPCs 120 may comprise different number of ports. For instance, a first CPC 120 may comprise m internal ports (Q1 to Qm) and n front-panel ports (P1 to Pn), and a second CPC 120 may comprise m' internal ports (Q1 to Qm') and n' front-panel ports (P1 to Pn'), where n, m, n', and m' are integers that are not necessarily equal to one another. Alternatively, the CPCs 120 may comprise the same number of internal ports (m=m') and front-panel ports (n=n'). In an embodiment, some of the CPCs 120 may be symmetric, i.e., may comprise the same number of front-panel ports and internal ports (n=and/or n'=m'). In this case, there may be a one-to-one relationship between each front-panel port and an internal port of the CPC 120. As such, the traffic received via one of the front-panel ports, P1 to Pn (or P1 to Pn'), may be forwarded to the corresponding internal port, Q1 to Qm (or Q1 to Qm'). In an embodiment, each link between the CPC 120 and the ESF 110 may have enough bandwidth to prevent traffic congestion at the CPC 120 in the ingress direction, i.e., from the CPC 120 to the ESF 110.

In an embodiment where the CPCs are symmetrical, each internal port of the CPC 120 may be assigned a locally or globally unique MAC address denoted by CPC-MAC(i,j) for the j-th port of the i-th CPC, where $1 \leq j \leq m$, $1 \leq i \leq k$, k is the number of CPCs 120, and i, j, and k are integers. Additionally, any front-panel port that is configured as an FCoE port (e.g. it forwards FCoE frames) may be assigned a locally or globally unique MAC address denoted by FCF-MAC(i,j) for the j-th port of the i-th CPC. A Virtual Local Area Network (VLAN) Identifier (VLAN_ID), for example VLAN-F, may be reserved and associated with the CPC-MAC addresses. The VLAN-F and CPC-MAC addresses may be stored in a MAC forwarding table, which may be static, for each internal port that couples the ESF 110 to one of the CPCs 120. As such, when an Ethernet frame received by the ESF 110 is tagged by the VLAN-F VLAN_ID and the CPC-MAC(k,h) destination MAC (DMAC) address, the frame may be forwarded to the h-th internal port of the k-th CPC. In the case of a one-to-one relationship between a front-panel port (configured as an FCoE port) and an internal port, for instance for a symmetric CPC 120, the two ports may share the same MAC address, i.e., FCF-MAC(i,j)=CPC-MAC(i,j).

In an embodiment, any front-panel port of the CPC 120 may be configured as an FC port that supports FC frames, a native Ethernet port that supports native or standard Ethernet frames, or an FCoE port that supports FCoE frames. When a front-panel port configured as a native Ethernet port receives an Ethernet frame, the CPC 120 may forward the frame in a transparent manner, i.e., pass the frame to the ESF 110 without substantially any processing. Similarly, when the Ethernet frame is received from the ESF 110 on an internal port configured as a native Ethernet port, the frame is transparently forwarded to the Tx/Rx 130 without substantially any processing.

An FC port may be configured as an F_Port or an E_Port, for instance based on Rev 8.0 of the INCITS T11, and an FCoE port may be configured to support VF_Ports or VE_Ports, for instance based on Rev 1.01 of the INCITS T11. An F_Port may support an N_Port or one or more VN_Ports using N_Port Identifier Virtualization (NPIV), for instance based on Rev 2.00 for Fiber Channel Link Services (FC-LS-2) of the INCITS T11, published Jun. 26, 2008, which is incorporated herein by reference as if reproduced by its entirety. A VF_Port may also support one or more VN_Ports. The N_Port or VN_Port may be assigned a 24-bit FC Identifier (FCID) by the switch coupled to the port. In the case of an FCoE port, a VN_Port may be assigned a MAC address in addition to the 24-bit FCID. For instance, in a Fabric Provided MAC Address (FPMA) scheme, the first about 24 bits of the VN_Port MAC address may be a MAC Address Prefix (MAP), which may be the same for all the FCoE switches in the same SAN, and the last about 24 bits of the VN_Port MAC address may represent the FCID. Alternatively, in a Server Provided MAC Address (SPMA) scheme, the MAC address may be suggested by the node that comprises the VN_Port and then confirmed by the switch attached to the VN_Port. The VF_Port may support either one of the FPMA or SPMA schemes, but generally may not support both.

In an embodiment, the FC frames forwarded from a VN_Port may comprise a Source_ID (S_ID) equal to the 24-bit FCID assigned to the VN_port, and the FC frames forwarded to a VN_Port may comprise a Destination_ID (D_ID) equal to the 24-bit FCID of the VN_Port. Additionally, the forwarded or received FC frames may also comprise a Domain_ID, also referred to as Switch_ID, equal to the first about eight bits of the FCID, and a Station_ID (S_ID) equal to the last about 16 bits of the FCID. The FCoE switch architecture 100 may support up to about 65,535 S_IDs minus some reserved IDs that uniquely identify the VN_Ports. The FC frames forwarded to or received from the F_Port or the FCoE frames forwarded to or received from the VE_Port may also comprise a Virtual Fabric Tag header (VFT_header), which may be an extended header in an FC or FCoE frame that supports Virtual SAN (VSAN), for instance based on Rev 8.0 of the INCITS T11. However, the FC frames received at the F_Ports or the FCoE frames received at the VF_Ports may not comprise the VFT_header. Further, any front-panel port configured as an FC port may process a received FC frame depending whether the port is an F_Port or E_Port, as described in detail below.

In an embodiment, any front-panel port configured as an FCoE port may be enabled to support FCoE frames, standard Ethernet frames, or both. If the port is not enabled to support standard Ethernet frames, then all standard Ethernet frames received at the port may be discarded by the CPC 120. For instance, the CPC 120 may discard all frames received at the port, which may have an Ethertype different than the Ethertype of the FCoE or FIP. If the port is enabled to support standard Ethernet frames, then all standard Ethernet frames received at the port may be transparently passed through the CPC 120 to the ESF 110 without substantially any processing. Similarly, all FCoE frames received at the port may be discarded when the FCoE frame support is not enabled, or may be processed when the FCoE frame support is enabled. The FCoE port may process both FCoE frames and FIP frames, but how the FCoE port processes the FCoE frames and the FIP frames may depend on whether the port is configured as a VF_Port or VE_Port.

The Tx/Rxs 130 may be any devices or components configured to transmit and/or receive data to and from the CPC 120 and/or the ESF 110. For instance, at least one of the Tx/Rxs 130 may transmit/receive FCoE or FC frames to/from the CPC 120. Additionally, at least one of the Tx/Rxs 130 may be coupled directly to the ESF 110 and may send/receive standard Ethernet frames to/from the ESF 110. The Tx/Rxs 120 may be configured to transmit/receive the data in the form of electrical or optical signals and may be configured with optical-to-electrical (O-E) and/or electrical-to-optical (E-O) converters.

The FCoE switch architectures 100 described above may be used to build smaller top of rack (TOR) switches or larger chassis based switches. For instance, the FCoE switch architecture 100 may be used to obtain a TOR switch based on one ESF 110, which may have a larger port density than some of the currently used switches. For example, the ESF 110 may comprise from about 24 to about 64 ten Gigabit/one Gigabit (10 G/1 G) ports. Further, the FCoE switch architecture 100 may provide more flexible support for FCoE ports and FC ports than the currently used switches. Another advantage of using the FCoE switch architecture 100 may be improved scalability due to offloading some frame processing functions from the ESF 110 to the remaining components, such as the CPCs 120. Additionally, an external data buffer may be added to the CPCs 120 in the FCoE switch architecture 100 in addition to the ESF 110 internal data buffer, which may increase data buffering capability. In an embodiment, the FCoE switch architectures 100 may be an FC switch, e.g. when all of the switch's external ports are configured as FC ports.

Figure 2:
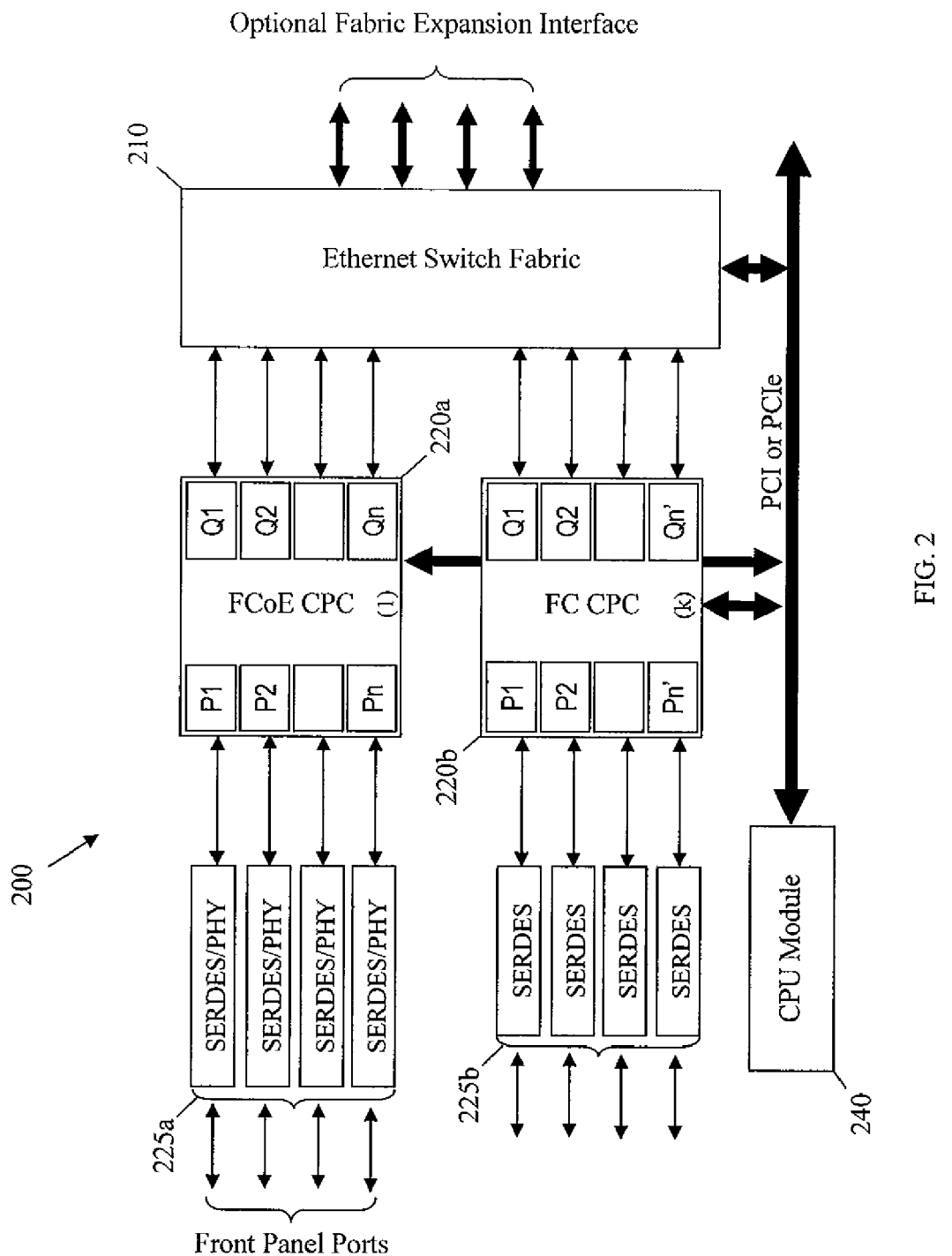
FIG. 2 is a schematic diagram of another embodiment of an FCoE switch architecture.

FIG. 2 illustrates another embodiment of an FCoE switch architecture 200, which may be a low level design of the FCoE switch architecture 100. The FCoE switch architecture 200 may comprise an ESF 210 coupled to at least one FCoE CPC 220a, optionally at least one FC CPC 220b, and an optional fabric expansion interface. The FCoE CPC 220a may be coupled to a plurality of serializers/deserializers for the physical layer (SERDES/PHY) 225a and the FC CPC 220b may be coupled to a plurality of serializers/deserializers (SERDES) 225b. The FCoE architecture 200 may also comprise a Central Processing Unit (CPU) module 240 coupled to the ESF 210, the FCoE CPC 220a, and the FC CPC 220b, for instance via a Peripheral Component Interconnect (PCI) or PCI Express (PCIe) interface. The ESF 210, the FCoE CPC 220a, and the FC CPC 220b may be configured similar to the corresponding components of the FCoE switch architecture 100.

The SERDES/PHYs 225a may be configured to receive FCoE frames in the ingress direction, for instance from a plurality of Tx/Rxs via a plurality of front-panel ports, and send the frames to the ports of the FCoE CPC 220a. The SERDES/PHYs 225a may also convert between parallel and serialized data frames. The SERDES/PHYs 225a may also receive FCoE frames in the egress direction from the FCoE CPC 220a and send the frames to the Tx/Rxs. The operations of the SERDES/PHYs 225a may be performed at the physical layer (PHY) of the Open Systems Interconnection (OSI) model. The SERDES/PHYs 225a may exchange data with the FCoE CPC 220a via a 10 Gigabit Media Independent Interface Attachment Unit Interface (XAUI), or other suitable frame interfaces.

The FCoE CPC 220a may comprise a plurality of internal ports, Q1 to Qn, coupled to the ESF 210, and a plurality of ports, P1 to Pn, each coupled to a corresponding SERDES/PHY 225a. The FCoE CPC 220a may process the FCoE frame data, for instance encapsulate/de-capsulate the FC frames in the FCoE frames, and send/receive the FC frames to/from the CPU module 240 via a PCI or PCIe. Additionally, the FCoE CPC 220a may send/receive standard Ethernet data, such as Ethernet frames, to/from the ESF 210 over any internal port, for instance via a XAUI. In turn, the ESF 210 may send/receive the Ethernet frame data to the CPU module 240 via the PCI or PCIe.

The SERDESes 225b may be configured to send/receive FC frames, for instance to/from a plurality of Tx/Rx via a plurality of front-panel ports, convert between parallel and serial data in the frames, and send/receive the converted data to/from the ports of the FC CPC 220b.

The FC CPC 220b may comprise a plurality of internal ports, Q1 to Qn', coupled to the ESF 210, and a plurality of ports, P1 to Pn', each coupled to a corresponding SERDES 225b. The FC CPC 220b may process the FC frame data, for instance encapsulate/de-capsulate the FC frames, and send/receive the data to/from the CPU module 240 via the PCI or PCIe. Additionally, the FC CPC 220b may exchange data with the ESF 210 over the internal ports via a XAUI. As shown above, when the received frames are FC frames, the CPC(s) may encapsulate the FC frames in an Ethernet frame, thereby producing an FCoE frame. Alternatively or additionally, when the received frames are FCoE frames, the CPC(s) may modify the FCoE frames, thereby producing a modified FCoE frame. In either case, the incoming frames are transformed into FCoE frames, which are switched by the ESF 210 and then returned to the CPC(s). On the egress side, the CPC(s) then remove the Ethernet framing from any encapsulated FC frames, thereby producing the original FC frames. Alternatively or additionally, the modified FCoE frames are unmodified, thereby producing the original FCoE frames.

Figure 3:
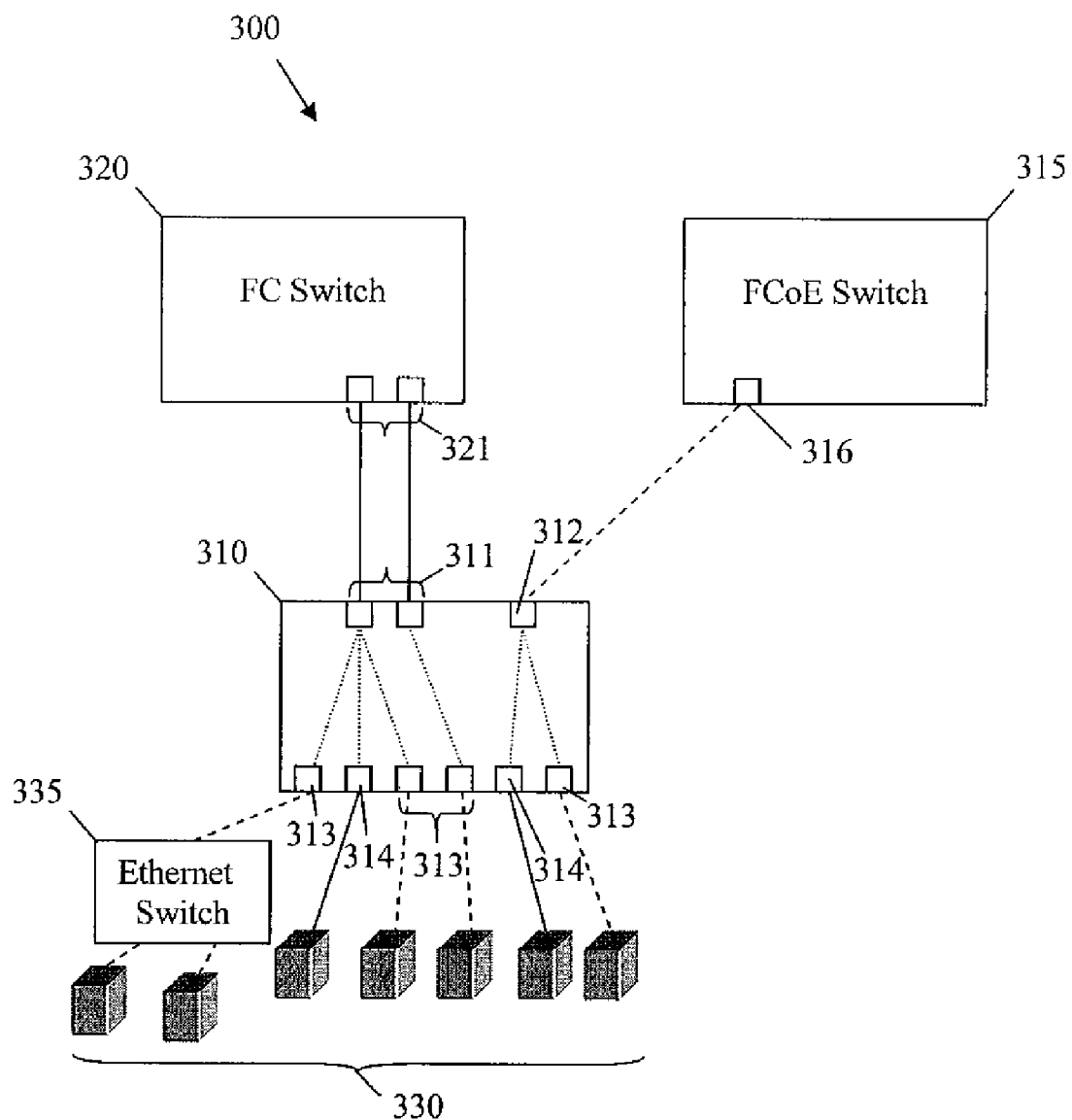
FIG. 3 is a schematic diagram of an embodiment of an FCoE switch operating in the NPV mode.

FIG. 3 illustrates another embodiment of an FCoE switch architecture 300, which may support N_Port Virtualizer (NPV). The NPV creates an N_Port where one would not otherwise be present. The first FCoE switch 310 in NPV mode may be coupled to a second FCoE switch 315 and an FC switch 320 via a plurality of network facing ports 311 and 312, and to a plurality of servers 330 via a plurality of server facing ports 313 and 314. In an embodiment, the first FCoE switch 310 may be one of the FCoE switch architectures 100 or 200. Additionally, at least one of the servers 330 may be coupled to the first FCoE switch 310 via an Ethernet switch 335. NPV may allow the FC switch 320 and the FCoE switch 315 to assign FCIDs to the servers 330. In an embodiment, both switches 320 and 315 may be FC switches. In another embodiment, both switches 320 and 315 may be FCoE switches. Yet in another embodiment, the FCoE switch 310 in NPV mode may be coupled to a plurality of FC switches and/or a plurality of FCoE switches.

The first FCoE switch 310 may be configured to operate in the NPV mode to process and forward the different frames between the servers and other upstream FCoE switch 315 and FC switch 320. The first FCoE switch 310 may act like an N_Port proxy, which may establish a connection to the FC switch 320, the second FCoE switch 315, or both. As such, the network facing ports 311 coupled to the FC switch 320 may be configured as N_Ports and a plurality of corresponding switch ports 321 of the FC switch 320 may be associated with the N_Ports and configured as F_Ports. Additionally, the network facing port 312 coupled to the second FCoE switch 315 may be configured as a VN_Port and a corresponding switch port 316 of the second FCoE switch 315 may be associated with the VN_Port and configured as a VF_Port. The N_Ports and/or VN_Ports may be assigned FCIDs by the FC switch 320 and/or the second FCoE switch 315. The relationship between the network facing ports 311 and 312 and the server facing ports 313 and 314 of the first FCoE 310 may be pre-configured. For instance, the server facing ports 313 may be configured as VF_Ports and the server facing ports 314 may be configured as F_Ports. At least one of the server facing ports 313 may be front-panel ports that establish connections with some of the servers 330 via the Ethernet switch 335, and at least one of the server facing ports 314 may be front-panel ports that establish direct connections with some of the servers 330. Further, each server facing port 313 or 314 may be associated with one network facing port 311 or 312, but each network facing port 311 and/or 312 may be associated with a plurality of server facing ports 313 and/or 314.

Figure 4:
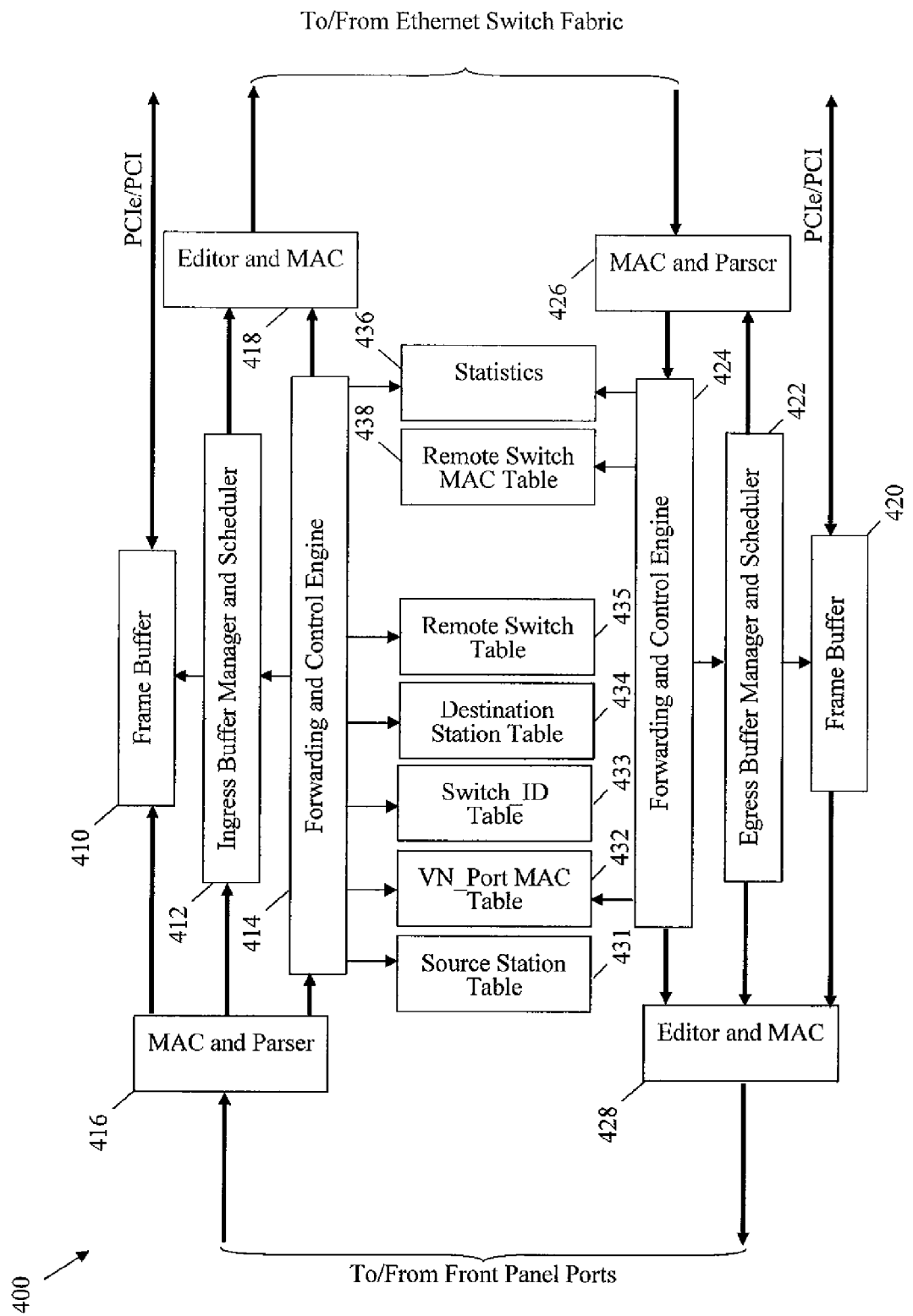
FIG. 4 is a schematic diagram of an embodiment of an FCoE CPC.

FIG. 4 illustrates an embodiment of an FCoE CPC 400, which may be used in the FCoE switch architecture 100 or the FCoE switch architecture 200. The FCoE CPC 400 may comprise a first Frame Buffer 410, an Ingress Buffer Manager and Scheduler 412, and a first Forwarding and Control Engine 414, which may couple a first MAC and Parser module 416 to a first Editor and MAC module 418. Additionally, the FCoE CPC 400 may comprise a second Frame Buffer 420, an Egress Buffer Manager and Scheduler 422, and a Second Forwarding and Control Engine 424, which may couple a second MAC and Parser module 426 to a second Editor and MAC module 428. The first Forwarding and Control Engine 414 may also be coupled to a Source Station Table 431, a VN_Port MAC Table 432, a Switch_ID Table 433, a Destination Station Table 434, a Remote Switch Table 435, and Statistics Data 436. The second Forwarding and Control Engine 424 may also be coupled to a VN_Port MAC Table 432, a Remote Switch MAC Table 438, and the Statistics Data 436.

The first MAC and Parser module 416 may be configured to perform a MAC function to parse or analyze the FCoE frames received from a front-panel port coupled to the FCoE CPC 400, for instance via a XAUI. The Ingress Buffer Manager and scheduler 412 may be configured to communicate with the first MAC and Parser module 416 and the first Frame Buffer 410 to store the parsed frames in the first Frame Buffer 410 and schedule the forwarding of the frames to an ESF coupled to the FCoE CPC 400. For instance, the Ingress Buffer Manager and Scheduler 412 may schedule frame forwarding using Per-priority queuing and a WRR scheduling scheme. The first Frame Buffer 410 may also be configured to exchange data with a CPU module, which may be coupled to the FCoE CPC 400 via a PCI or PCIe. The first Forwarding and Control Engine 414 may be configured to communicate with the first MAC and Parser module 416 and the Ingress Buffer Manager and Scheduler 412 to forward the stored frames to the first Editor and MAC module 418. The first Forwarding and Control Engine 414 may use any information in the Source Station Table 431, VN_Port MAC Table 432, Switch_ID Table 433, Destination Station Table 434, Remote Switch Table 435, and/or Statistics Data 436 to process the frames. The first Editor and MAC module 418 may communicate with the Ingress Buffer Manager and Scheduler 412 and the first Forwarding and Control Engine 414 to receive the forwarded frames, and then modify and send the frames to be received appropriately by the ESF, for instance via a XAUI. In an embodiment, the first Editor and MAC module 418 may receive FCoE frames from the front-panel port and modify the frames into different FCoE frames as described herein.

The second MAC and Parser module 426 may be configured to perform a MAC function to parse or analyze the frames received from the ESF, for instance via a XAUI. The Egress Buffer Manager and scheduler 422 may be configured to communicate with the second MAC and Parser module 426 and the second Frame Buffer 420 to store the parsed frames in the second Frame Buffer 420 and schedule the forwarding of the frames to the front-panel port. Similar to the first Frame Buffer 410, the second Frame Buffer 420 may also exchange data with the CPU module via a PCI or PCIe. The second Forwarding and Control Engine 424 may be configured to communicate with the second MAC and Parser module 426 and the Egress Buffer Manager and Scheduler 422 to forward the stored frames to the second Editor and MAC module 428. The second Forwarding and Control Engine 424 may use any information in the VN_Port MAC Table 432, Remote Switch MAC Table 438, and/or Statistics Data 436 to process the frames. The second Editor and MAC module 428 may communicate with the Egress Buffer Manager and Scheduler 422 and the second Forwarding and Control Engine 424 to receive the forwarded frames, and then modify and send the frames to the front-panel port, for instance via a XAUI. In an embodiment, the second Editor and MAC module 428 may receive standard Ethernet frames or FCoE frames from the ESF and modify the frames into different Ethernet frames as described herein.

In the case of traffic congestion, priority-based flow control messages may be forwarded by the Ingress Buffer Manager and Scheduler 412 to the ESF (or by the Egress Buffer Manager and Scheduler 422 to the front-panel port) directly without storing the frames in the first Frame Buffer 410 (or the second Frame Buffer 420). The flow control between the FCoE CPC 400 and the ESF may be priority-based when the ESF supports the priority-based flow control. Additionally, priority-based flow control may be used by CPCs 120 or FCoE CPCs 220a even when the ESF supports non-priority flow control. Further, incoming frames from the front-panel port (or the ESF) may be forwarded using a cut-through scheme, if the first frame buffer 410 (or the second frame buffer 420) is empty. The various tables and data illustrated in FIG. 4 may be stored in separate memory components. Alternatively, at least one of the various tables and data illustrated in FIG. 4 may be stored in a single memory component.

Figure 5:
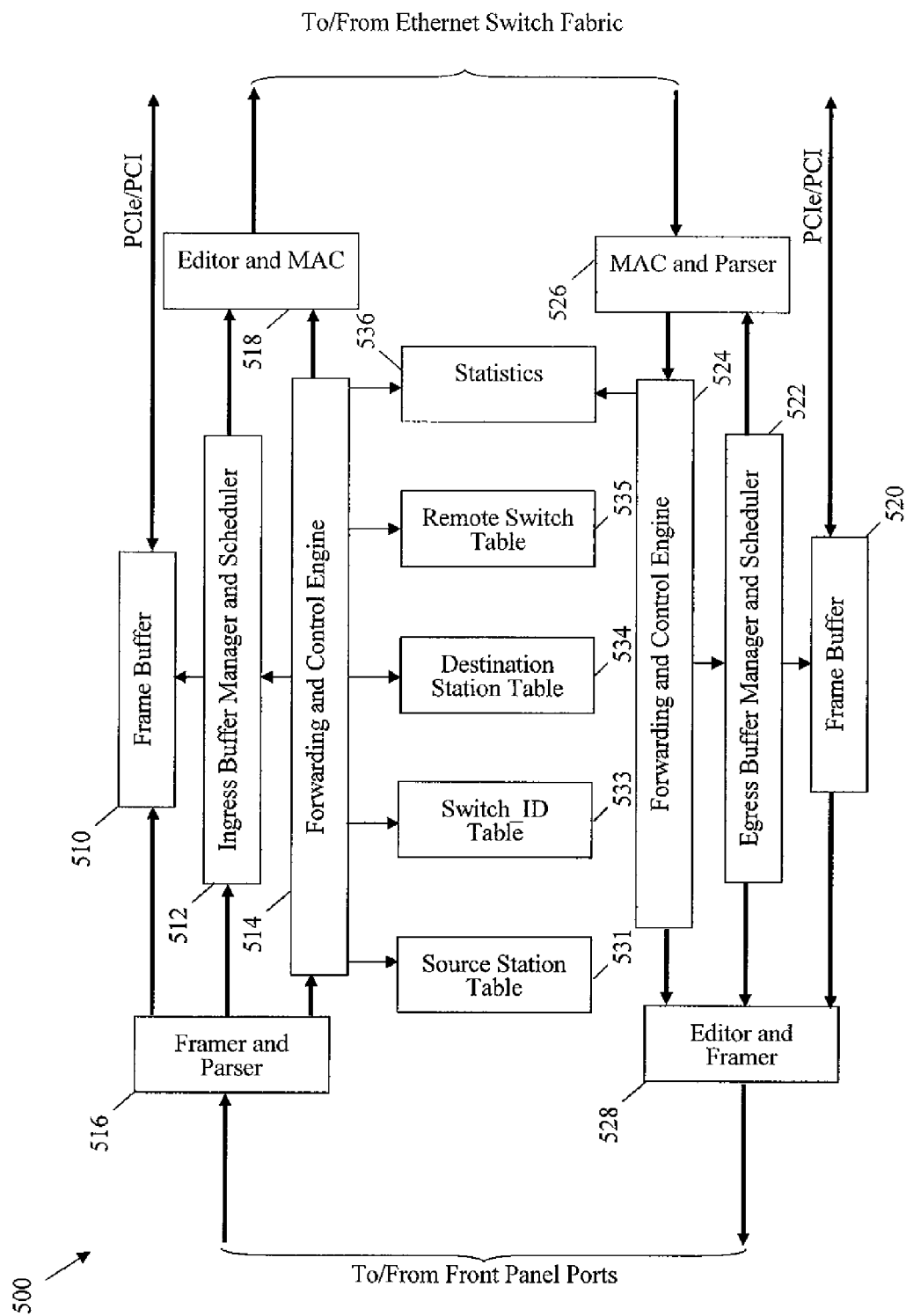
FIG. 5 is a schematic diagram of an embodiment of an FC CPC.

FIG. 5 illustrates an embodiment of an FC CPC 500, which may be used in the FCoE switch architecture 100 or the FCoE switch architecture 200. The FC CPC 500 may comprise a first Frame Buffer 510, an Ingress Buffer Manager and Scheduler 512, and a first Forwarding and Control Engine 514, which may couple a Framer and Parser module 516 to an Editor and MAC module 518. Additionally, the FC CPC 500 may comprise a second Frame Buffer 520, an Egress Buffer Manager and Scheduler 522, and a second Forwarding and Control Engine 524, which may couple a MAC and Parser module 526 to an Editor and Framer module 528. The first Forwarding and Control Engine 514 may also be coupled to a Source Station Table 531, a Switch_ID Table 533, a Destination Station Table 534, a Remote Switch Table 535, and Statistics Data 536. The second Forwarding and Control Engine 524 may also be coupled to the Statistics Data 536.

The components of the FC CPC 500 may be configured similar to the corresponding components of the FCoE CPC 400 described above. However, unlike the first MAC and Parser module 416 of the FCoE CPC 400, the Framer and Parser module 516 of the FC CPC 500 may be configured to perform FC-0, FC-1, and FC-2 layer functions, e.g. to parse the FC frames received from a front-panel port. Additionally, the first Editor and MAC module 418 may receive FC frames from the front-panel port and convert the frames into FCoE frames, and accordingly, the Editor and Framer module 528 may receive FCoE frames from the ESF and convert the frames into FC frames. The flow control between FC CPC 500 and the ESF may be priority-based or non-priority-based. The various tables and data illustrated in FIG. 5 may be stored in separate memory components. Alternatively, at least one of the various tables and data illustrated in FIG. 5 may be stored in a single memory component.

In an embodiment, the FCoE CPC and FC CPC may be fabricated on a single component, such as on the same circuit board or chip. Alternatively, the FCoE CPC and FC CPC may be fabricated on separate components. The circuit board or chip may comprise the same quantity of FCoE CPCs and/or FC CPCs, or different quantities of FCoE CPCs and/or FC CPCs. Further, the FCoE CPCs and/or FC CPCs in the FCoE switch architecture may have the same quantity of ports or different quantities of ports. The FCoE CPCs and/or FC CPCs may also comprise the same quantity of tables or different quantities of tables. The FCoE CPC and FC CPC may also be coupled to the same ESF, for instance on the same circuit board or chip, or to different ESFs, which may have different densities, models, and/or vendors. The FCoE CPC and FC CPC may be packaged on separate components similarly of differently. For instance, the shape and size of the circuit boards or chips that comprise the FCoE CPC and FC CPC may be similar or different. The FCoE CPC and/or FC CPC may also be coupled to an ESF and/or a CPU module on a separate circuit board or chip. It will be appreciated that a CPC may support both FCoE and FC ports, and that the FCoE CPC and FC CPC described herein are specific embodiments of the CPC.

Figure 6:
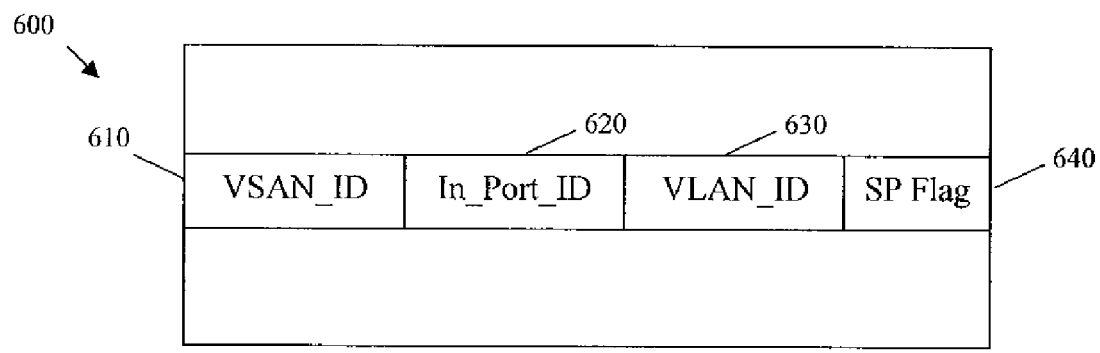
FIG. 6 is a schematic diagram of an embodiment of a Source Station Table.

FIG. 6 illustrates an embodiment of a Source Station Table 600, which may be used by the FCoE switch to make frame forwarding decisions. Specifically, the Source Station Table 600 may be used to determine whether the VN_Port sending an FCoE frame is registered and/or obtain the VSAN Identifier (VSAN_ID) associated the S_ID of the frame and a port ID and a VLAN ID on which the S_ID is expected. The Source Station Table 600 may comprise at least one entry comprising a VSAN_ID 610 and an associated ingress port ID (In_Port_ID) 620 and a VLAN ID 630, and a SP flag 640. In an embodiment, a SP flag 640 set to about one indicates that the SPMA scheme is used, wherein a SP flag 640 set to about zero indicates that the FPMA scheme is used. When a frame's Station_ID in the S_ID, which may be equal to the last about 16 bits of the S_ID of the frame, is present in the Source Station Table 600, the port sending the frame is registered. In such a case, the frame's S_ID and port ID may be used to obtain the VSAN_ID 610 associated with the frame. The VLAN ID 630 may not be needed in the Source Station Table 600 if the FCoE ports only use one VLAN_ID 630 to support FCoE.

Figure 7:
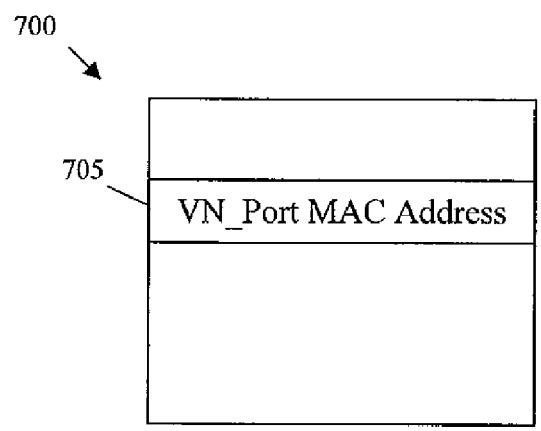
FIG. 7 is a schematic diagram of an embodiment of a VN_Port MAC Table.

FIG. 7 illustrates an embodiment of a VN_Port MAC Table 700, which may be used by the FCoE switch to make frame forwarding decisions. Specifically, the VN_Port MAC Table 700 may be used to determine whether the VN_Port sending an FCoE frame is registered, and/or to obtain a VN_Port MAC address associated with the S_ID of the frame in the SPMA scheme. The VN_Port MAC Table 700 may comprise at least one entry comprising a VN Port MAC 705. When a frame's Station_ID in the S_ID is present in the VN_Port MAC Table 700, the port sending the frame is registered. In such a case, the frame's S_ID may be used to obtain the VN_Port MAC 705 associated with the S_ID.

Figure 8:
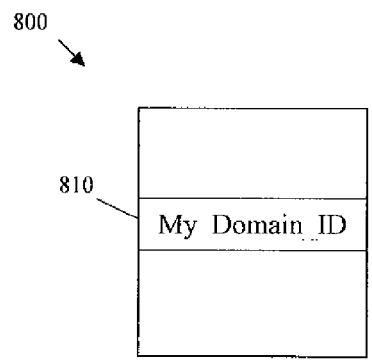
FIG. 8 is a schematic diagram of an embodiment of a Switch_ID Table.

FIG. 8 illustrates an embodiment of a Switch_ID Table 800, which may be used by the FCoE switch to make frame forwarding decisions. Specifically, the Switch_ID Table 800 may be used to determine whether the VN_Port sending an FCoE frame is registered, and/or to obtain a Domain_ID, e.g. My-Domain_ID, associated with the VSAN_ID corresponding to the frame (e.g. the VSAN_ID in the Source Station Table 600). The Switch_ID Table 800 may comprise at least one entry comprising a Domain_ID 810. When a frame's VSAN_ID is present in the Switch_ID Table 800, the Domain_ID for the VSAN exists. In such a case, the frame's VSAN_ID may be used to obtain the Domain_ID 810 associated with the frame.

Figure 9:
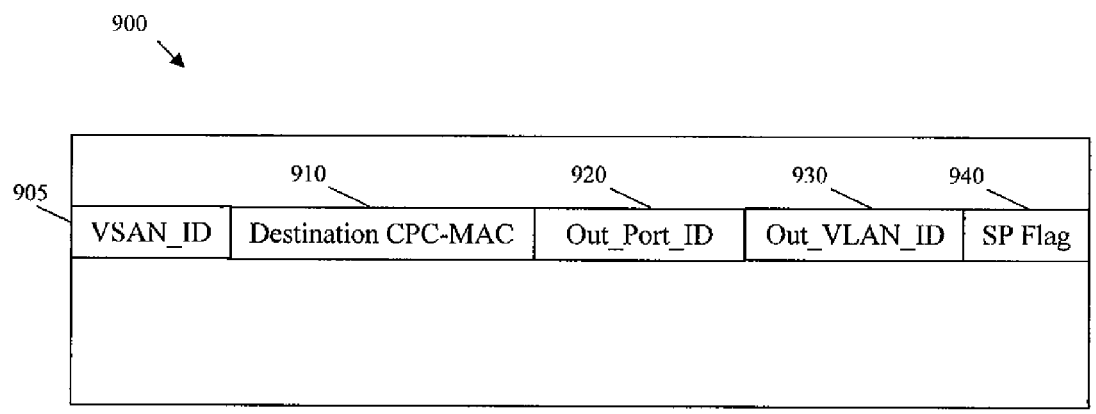
FIG. 9 is a schematic diagram of an embodiment of a Destination Station Table.

FIG. 9 illustrates an embodiment of a Destination Station Table 900, which may be used by the FCoE switch to make frame forwarding decisions. Specifically, the Destination Station Table 900 may be used to determine whether the VN_Port to receive an FCoE frame is registered, and/or to obtain a Destination CPC-MAC associated with the D_ID and VSAN_ID of the frame and a port ID and a VLAN_ID on which the D_ID is expected. The Destination Station Table 900 may comprise at least one entry comprising a VSAN_ID 905, a Destination CPC-MAC 910, an associated Egress Port ID (Out_Port_ID) 920, an associated VLAN_ID 930 (Out_VLAN_ID), and an associated SP Flag 940. When a frame's Station_ID in the D_ID, which may be equal to the last about 16 bits of the D_ID of the frame, is present in the Destination Station Table 900, the port to receive the frame is registered. In such a case, the frame's Station_ID of the D_ID may be used to obtain the VSAN_ID, the Destination CPC-MAC, and port ID associated with the frame. The Out_VLAN_ID 930 may not be needed in the Destination Station Table 900 if the FCoE port only uses one VLAN_ID 930 to support FCoE. The Out_Port_ID 920 may not be needed if the egress CPC is symmetric (e.g., there is one-to-one relationship between an internal port and a front-panel port of a CPC).

Figure 10:
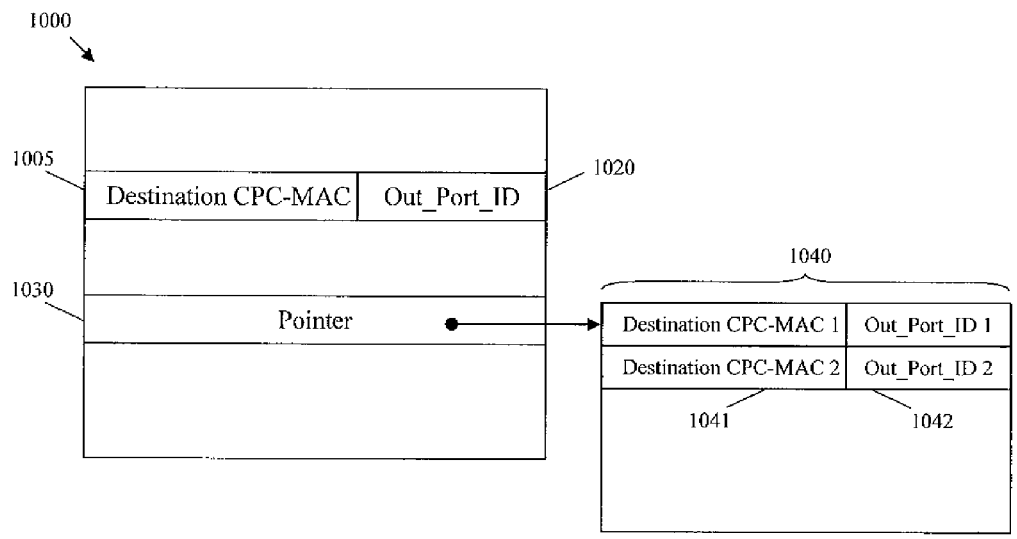
FIG. 10 is a schematic diagram of an embodiment of a Remote Switch Table.

FIG. 10 illustrates an embodiment of a Remote Switch Table 1000, which may be used by the FCoE switch to make frame forwarding decisions. Specifically, the Remote Switch Table 1000 may be used to determine whether a remote switch to which the FCoE frames are destined exists, and/or to obtain the Destination CPC-MAC associated with the D_ID and VSAN_ID of the frame and a port ID on which the frame is transmitted. The Remote Switch Table 1000 may comprise at least one entry comprising a Destination CPC-MAC 1005 and an associated Out_Port_ID 1020. When a frame's VSAN_ID and Domain_ID in the D_ID, which may be equal to the first about eight bits of the D_ID of the frame, is present in the Remote Switch Table 1000, the remote switch destined to receive the frames exists. In such a case, the frame's Station_ID of the D_ID may be used to obtain the Destination CPC-MAC 1005, VSAN_ID, and port ID associated with the frame. The Out_Port_ID 1020 may not be needed if the egress CPC is symmetric. FIGS. 6, 8, 9, and 10 may also be applied to FC frames.

Further, to support frame forwarding over a plurality of remote switches, the Remote Switch Table 1000 may also comprise an entry comprising a Pointer 1030, which may point to a plurality of CPC-MAC addresses 1040 assigned to the CPC internal ports, which may be used to receive frames from the ESF. Each CPC-MAC address 1040 may comprise a Destination CPC-MAC 1041 and an associated Out_Port_ID 1042, which may be matched with a S_ID, D_ID, and/or Exchange ID in the frame. The CPC-MAC addresses 1040 may not be all distinct addresses. For example, a first CPC-MAC address value may appear about twice as often as a second CPC-MAC address value, which may indicate that the size of expected traffic associated with the first CPC-MAC address value may be about twice the size of the expected traffic associated with the second CPC-MAC address value.

Figure 11:
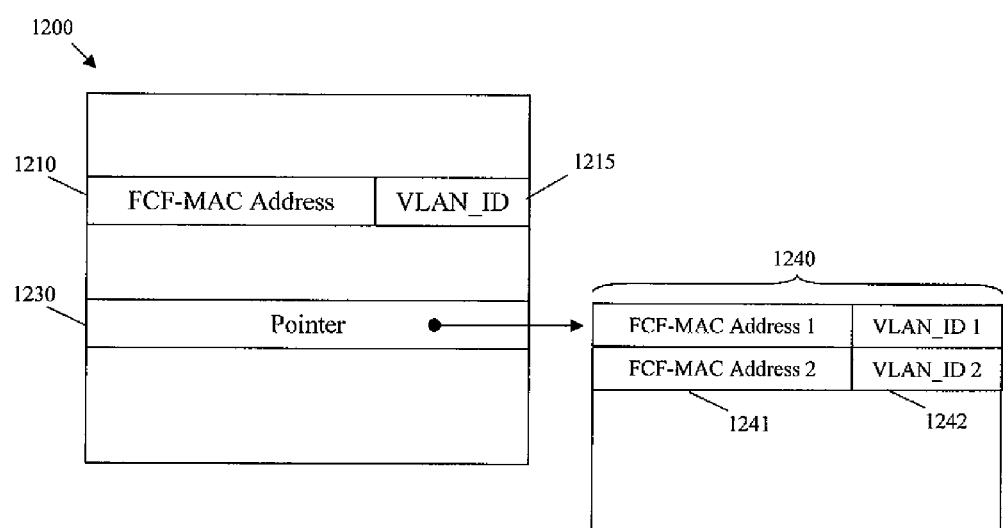
FIG. 11 is a schematic diagram of an embodiment of a Remote Switch MAC Table.

FIG. 11 illustrates an embodiment of a Remote Switch MAC Table 1200, which may be used by the FCoE switch to make frame forwarding decisions. Specifically, the Remote Switch MAC Table 1200 may be used to determine whether a remote switch to which the FCoE frames are destined exists, and/or to obtain an FCF-MAC Address associated with the D_ID and VSAN_ID of the frame. The Remote Switch MAC Table 1200 may comprise at least one entry comprising an FCF-MAC address 1210 and a VLAN _ID 1215. When a frame's VSAN_ID and Domain_ID in the D_ID, is present in the Remote Switch MAC Table 1200, the remote switch destined to receive the frames exists. In such a case, the frame's D_ID and VSAN_ID may be used to obtain the FCF-MAC address associated with the frame and the VLAN_ID on which the FCoE frames are transmitted. The VLAN_ID 1215 may not be needed if the FCoE port uses only one VLAN ID to support FCoE.

Further, to support frame forwarding over a plurality of remote switches, the Remote Switch MAC Table 1200 may also comprise an entry comprising a Pointer 1230, which may point to a plurality of FCF-MAC addresses 1240 assigned to the CPC external ports. Each FCF-MAC address 1240 may comprise an FCF-MAC address 1241 and a VLAN_ID 1242, which may be matched with the frame. The FCF-MAC addresses 1040 may not be all distinct addresses to indicate the size of the associated expected traffic.

Figure 12:
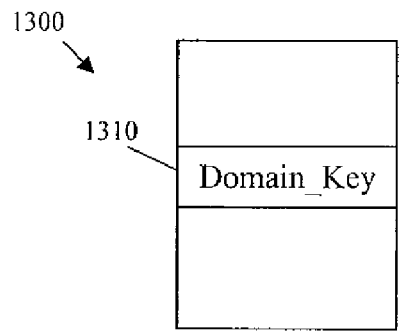
FIG. 12 is a schematic diagram of an embodiment of a Domain_Key Table

FIG. 12 illustrates an embodiment of a Domain_Key Table 1300, which may be used by the FCoE switch to support the NPV mode. Specifically, the Domain_Key Table 1300 may be used to map a Domain_ID, which may be about eight bits in length, to a much smaller number, referred to as a short Domain_ID. For instance, if the FCoE switch is in the NPV mode and connects to only two FC/FCoE switches, the Domain_Key 1310 may be shortened to a length of only about one bit.

Figure 13:
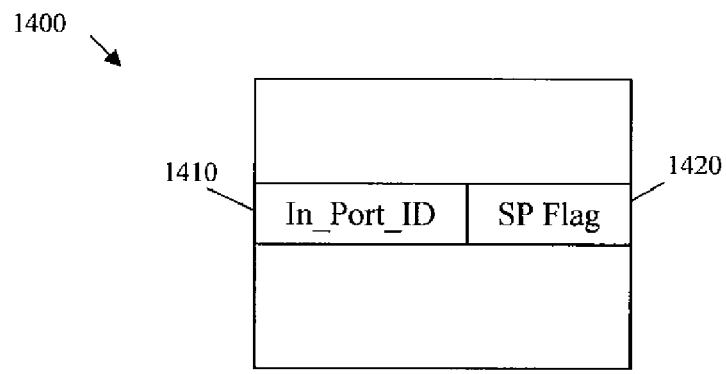
FIG. 13 is a schematic diagram of another embodiment of a Source Station Table.

FIG. 13 illustrates an embodiment of a Source Station Table 1400, which may be used by the FCoE switch to support the NPV mode. Specifically, the Source Station Table 1400 may be used to determine whether the VN_Port sending an FCoE frame is registered, and/or to obtain a port ID on which the S_ID is expected. The Source Station Table 1400 may comprise at least one entry comprising a port ID (In_Port_ID) 1410 and an associated SP Flag 1420. When a frame's short S_ID (Domain_Key plus the Station_ID of the S_ID) is present in the Source Station Table 1400, the port sending the frame is registered. In such a case, the frame's short S_ID may be used to obtain the port ID on which the S_ID is expected.

Figure 14:
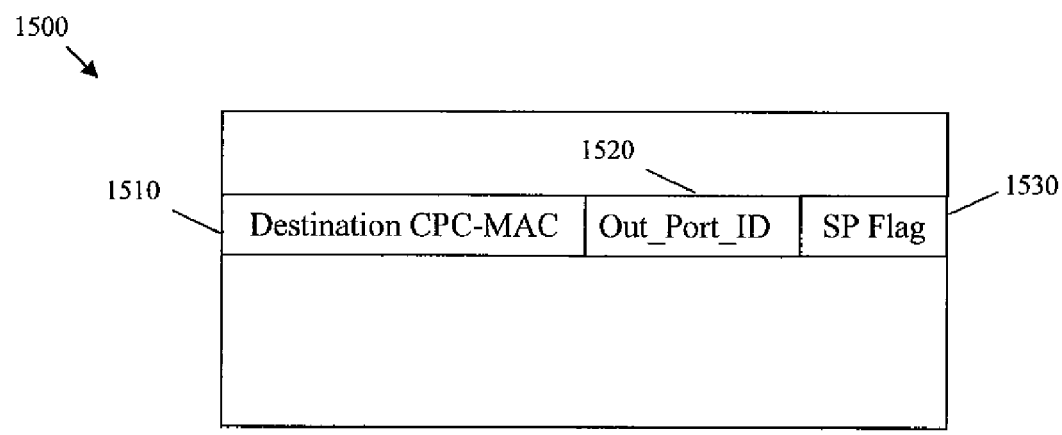
FIG. 14 is a schematic diagram of another embodiment of a Destination Station Table.

FIG. 14 illustrates an embodiment of a Destination Station Table 1500, which may be used by the FCoE switch to support the NPV mode. Specifically, the Destination Station Table 1500 may be used to determine whether a destination VN_Port to receive an FCoE frame is registered, and/or to obtain a Destination CPC-MAC associated with the D_ID and a port ID (Out_Port_ID) on which the FCoE frame is transmitted. The Destination Station Table 1500 may comprise at least one entry comprising a Destination CPC-MAC 1510, an associated Out_Port_ID 1520, and an associated SP Flag 1530. When a frame's short D_ID (Domain_Key plus the Station_ID of D_ID) is present in the Destination Station Table 1500, the VN_Port to receive the frame is registered. In such a case, the frame's short D_ID may be used to obtain the Destination CPC-MAC 1510 and the Out_Port_ID 1520 associated with the frame. The Out_Port_ID 1520 may not be needed if the egress CPC is symmetric.

Figure 15:
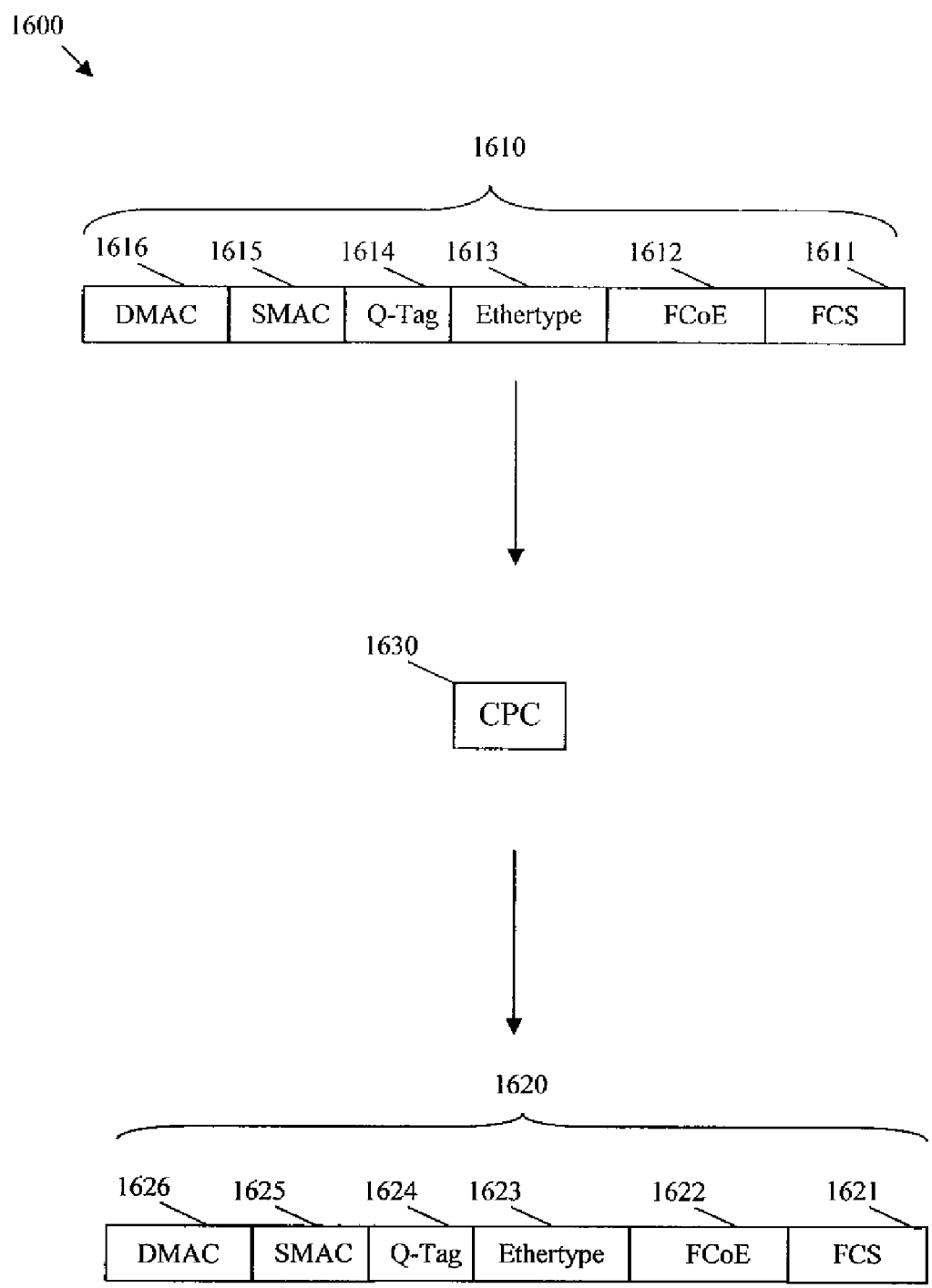
FIG. 15 is a schematic diagram of an embodiment of an FCoE Frame Formatting Process.

FIG. 15 illustrates an embodiment of an FCoE frame formatting process 1600, which may comprise a first FCoE frame 1610, a second FCoE frame 1620, and a CPC 1630. The CPC 1630 may be configured as described in the FCoE switch architecture 100, the FCoE switch architecture 200, or the NPV FCoE switch architecture 300. The first FCoE frame 1610 may comprise a first destination MAC (DMAC) 1616, a first Source MAC (SMAC) 1615, a first Q-Tag 1614, an Ethertype 1613 that indicates an FCoE frame, a first FCoE Payload 1612, and a first Frame Check Sequence (FCS) 1611. The second FCoE frame 1620 may comprise a second DMAC 1626, a second SMAC 1625, a second Q-Tag 1624, an Ethertype 1623 equal to the Ethertype 1613, a second FCoE Payload 1622, and a second FCS 1621. In an embodiment, the CPC 1630 may receive the first FCoE frame 1610, modify the first FCoE frame 1610 thereby generating the second FCoE frame, and forward the second FCoE frame 1620 to the ESF. For instance, the CPC 1630 may replace the first Q-Tag 1614 that comprises a first VLAN_ID value with a second Q-Tag 1624 that comprises a second VLAN ID value, such as VLAN-F. The CFC 1620 may also replace the first DMAC 1616 with the second DMAC 1626 equal to CPC-MAC(k,h) and the first SMAC 1615 with the second SMAC 1625 equal to CPC-MAC(i,j). Further, the second FCS 1621 may be different than the first FCS 1611, and the second FCoE payload 1622 may be different than the first FCoE Payload 1612 and may comprise a VSAN_ID, an Out_Port_ID, an SP Flag, and an L flag. In some embodiments, the VN_Port MAC field may only be used in the NPV mode.

Figure 16:
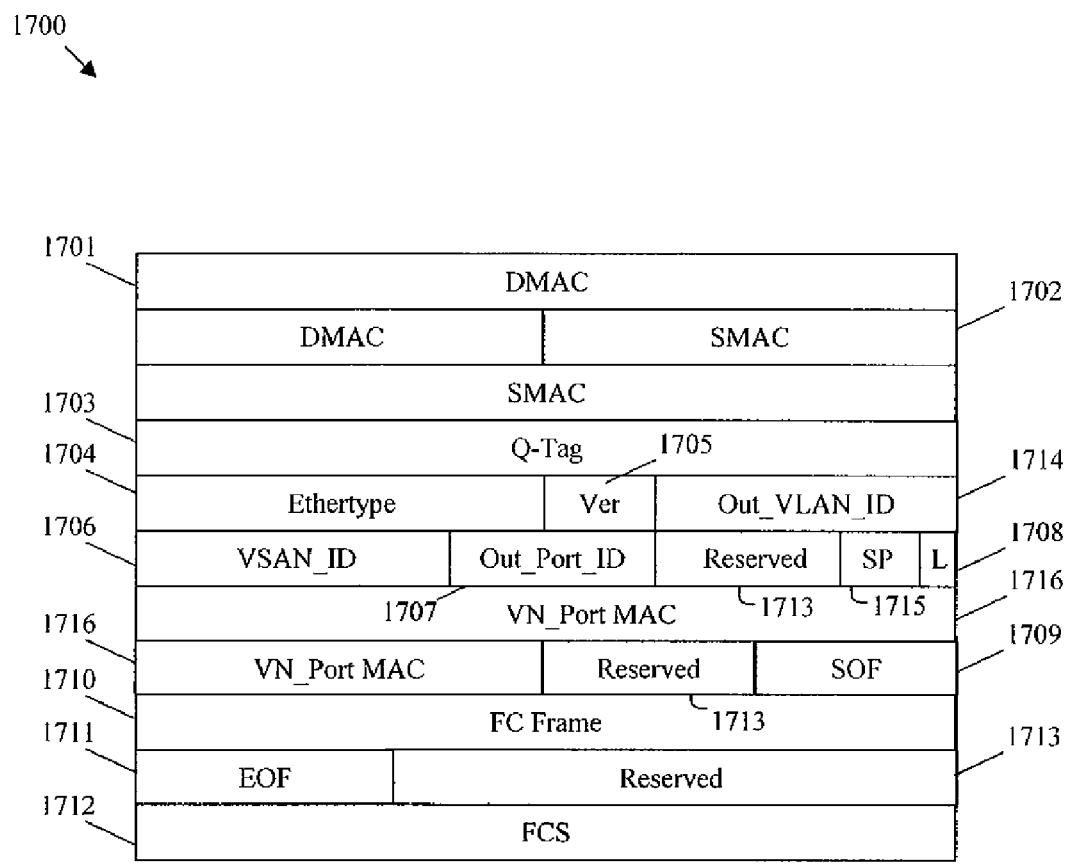
FIG. 16 is a schematic diagram of an embodiment of an internal FCoE frame format.

FIG. 16 illustrates an embodiment of an FCoE Frame Format 1700, which may be supported in the FCoE switch architecture described herein. The FCoE Frame Format 1700 may comprise a DMAC 1701, a SMAC 1702, and a Q-tag 1703, which may conform to the IEEE 802.1Q standard. For example, the Q-tag 1703 may comprise the VLAN_ID (e.g. equal to VLAN-F) that is associated with the frame. The FCoE Frame Format 1700 may also comprise an Ethertype 1704, which may be assigned a known value, such as 8906h, that indicates that the FCoE Frame Format 1700 is an FCoE frame. The FCoE Frame Format 1700 may also comprise a Version (Ver) field 1705, an Out_VLAN_ID 1714, a VSAN_ID 1706, an Out_Port_ID 1707, an SP Flag 1715, and an L flag 1708. Setting the L Flag 1708 to about one may indicate that the destination VN_Port is attached to the same (local) switch, whereas setting the L Flag 1708 to about zero may indicate the destination VN_Port is attached to a different (remote) switch. The FCoE Frame Format 1700 may also comprise a VN_Port MAC 1716, a Start of Frame (SOF) field 1709, an FC frame 1710, an End of Frame (EOF) field 1711, and an FCS 1712. The size of the Out_VLAN_ID 1714 may be about 12 bits. The size of the VSAN_ID 1706 may be equal to about 12 bits (e.g. from bit 20 to bit 31), the size of the Out_Port_ID 1707 may be equal to about eight bits, the size of the SP flag 1715 may be equal to about one bit, and the size of the L flag 1708 may be equal to about one bit. The FCoE Frame Format 1700 may optionally comprise at least one Reserved field 1713.

The basic frame forwarding functions of CPCs are described below. These flowcharts illustrate how to forward FC and FCoE frames; other routine functions of CPCs like frame error checking and statistics are known to persons of ordinary skill in the art and are not described herein. In addition, only VN_Ports are used to describe the source and destination of FC traffic. However, persons of ordinary skill in the art will appreciate that such description does not lead to a loss of generality as the below flowcharts can be adapted for other types of ports. As used herein, the following definitions may apply: (1) the S_ID may be a 24-bit FCID of the source VN_Port; (2) the D_ID may be the 24-bit FCID of destination VN_Port; (3) the Domain_ID may be the first 8 bits of FCID, which is also called Switch_ID; (4) the Station_ID may be the last 16 bits of FCID; and (5) the VFT_header may be an extended header in an FC frame to support VSAN. In addition, the following assumptions are made herein without a loss of generality: (1) the VN_Ports coupled to an FCoE switch are uniquely identified by the Station_ID, which means that for the 16-bit Station_ID, the FCoE switch can support up to about 65,535 VN_Ports; and (2) the FC/FCoE frames arriving to F_Ports/VF_Ports do not carry the VFT_header, which is the case in the current deployment. Finally, the below flowcharts illustrate the case of a frame arriving on j-th front-panel port of CPC(i), which will be forwarded to h-th internal port of CPC(k), wherein 1≦h≦n. The j-th port of CPC(i) may be configured as an FCoE port with MAC address FCF-MAC(i,j).

Figure 17A:
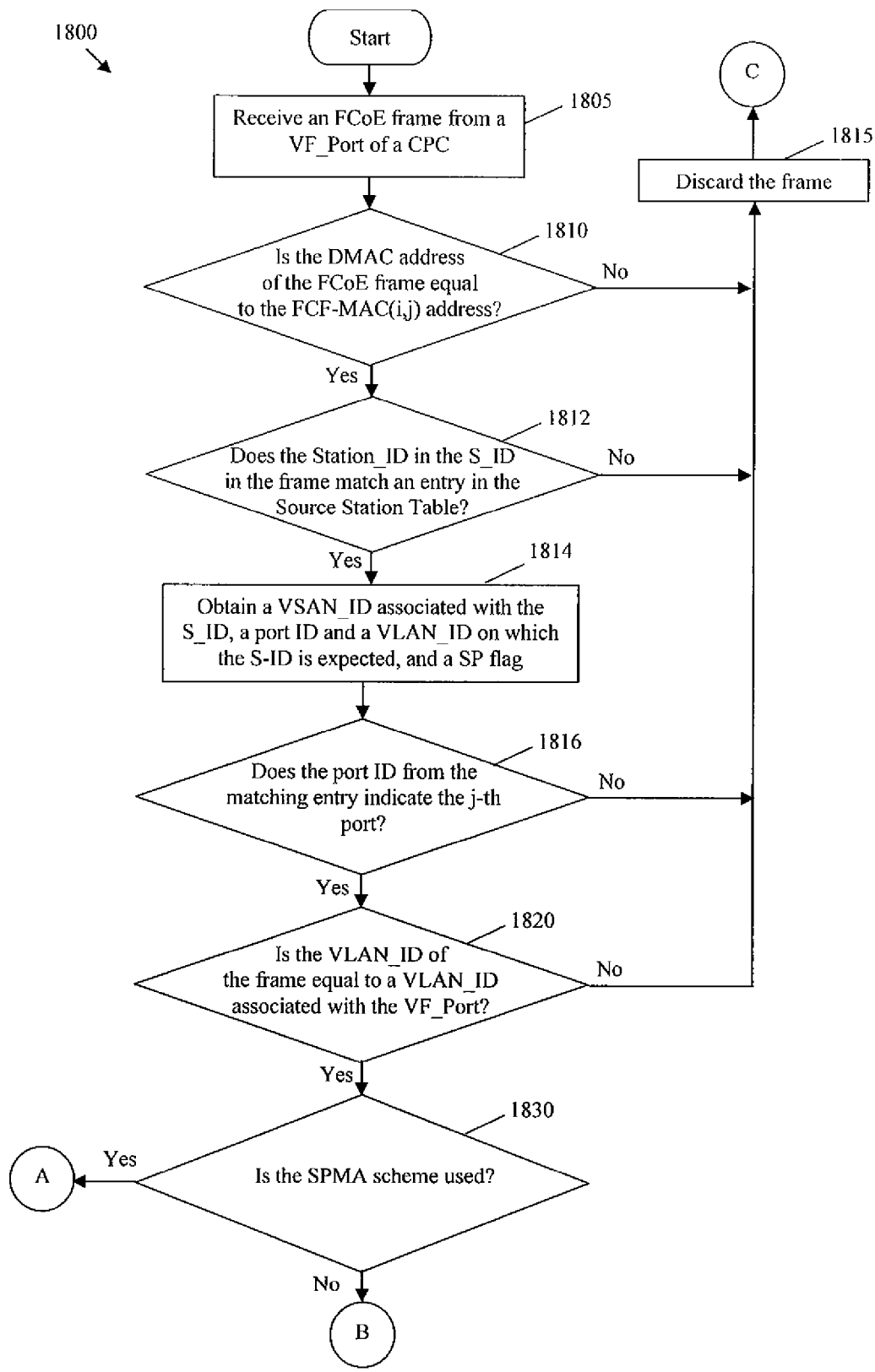
FIGS. 17A and 17B are a flowchart of an embodiment of an FCoE frame forwarding method for a VF_Port.
Figure 17B:
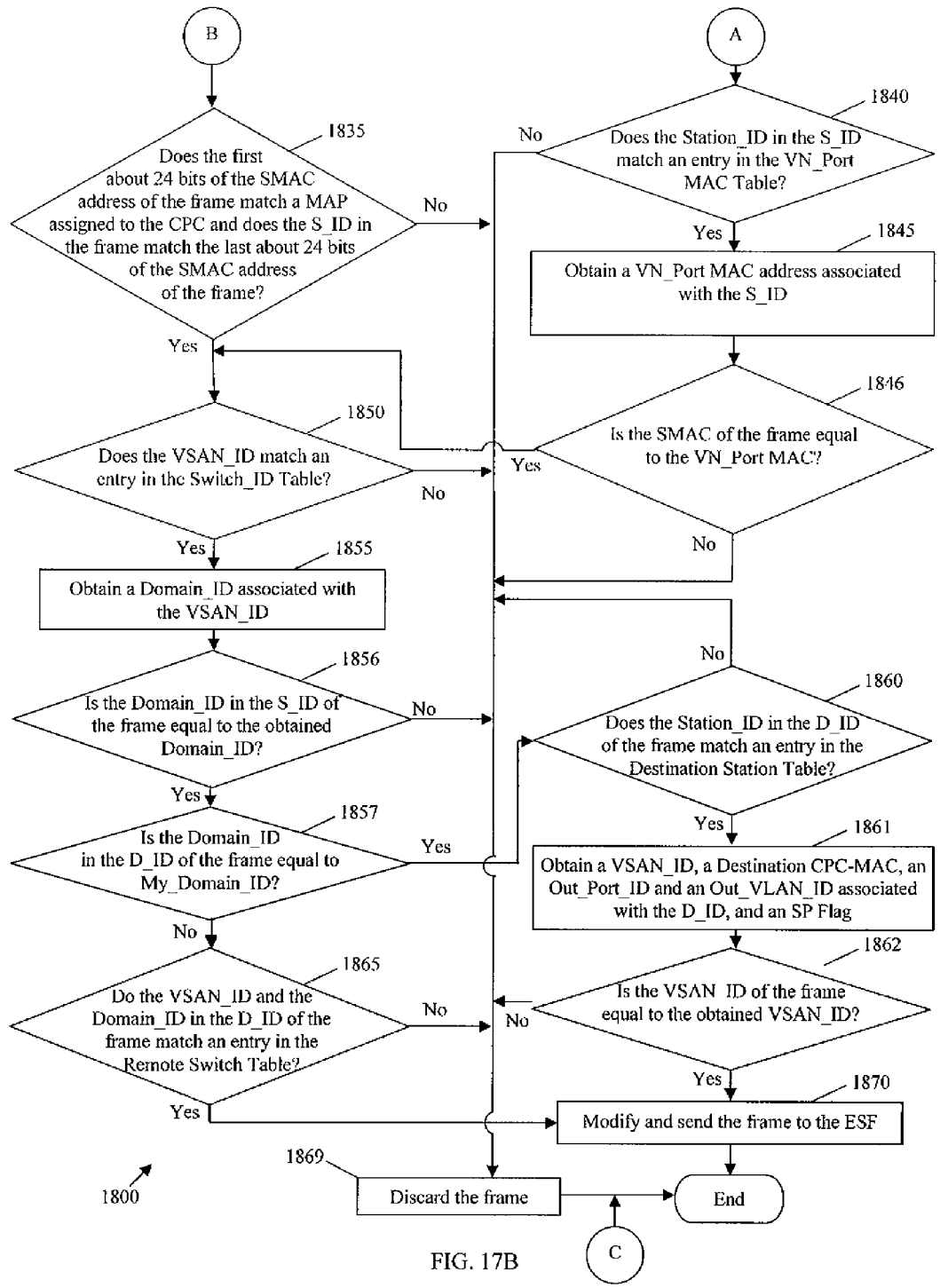

FIGS. 17A and 17B illustrate one embodiment of an FCoE frame forwarding method 1800, which may be used to forward the frames in the ingress direction from a CPC (e.g. CPC 120, FCoE CPC 220a, or FCoE CPC 400) to an ESF. The frames forwarded as described by the FCoE frame forwarding method 1800 may be FCoE frames received by a front-panel FCoE port configured as a VF_Port. As such, it will be appreciated that when an FCoE frame is formed, the VN_Port MAC field may be irrelevant and the Out_VLAN_ID may be irrelevant if the egress port is a VE_Port or an E_Port. The FCoE frame forwarding method 1800 may start at block 1805 in FIG. 17A, where an FCoE frame may be received at a VF_Port of the CPC. The method 1800 may then proceed to block 1810, where a determination may be made as to whether a DMAC address of an FCoE frame received by the VF_Port is equal to an FCF-MAC(i,j) address assigned to the j-th port and i-th CPC. If the DMAC address does not match the FCF-MAC(i,j) address, then the method 1800 may proceed to block 1815, where the frame may be discarded and the method 1800 may end. Otherwise, the method 1800 may proceed to block 1812.

At block 1812, a determination may be made as to whether a Station_ID in the S_ID in the frame matches an entry in a Source Station Table, such as the Source Station Table 600. If the Station_ID in the S_ID does not match an entry in the Source Station Table, then the VN_Port that sent the frame may not be registered. As such, the method 1800 may proceed to block 1815, where the frame may be discarded and the method 1800 may end. Otherwise, the method 1800 may proceed to block 1814, where a VSAN_ID (e.g. My-VSAN_ID), a port ID (e.g. In_Port_ID) and a VLAN_ID on which the S_ID is expected, and a SP flag may be obtained from the Source Station Table using the Station_ID in the S_ID. The method 1800 may then proceed to block 1816, where a determination may be made as to whether the port ID indicates the j-th port, e.g. whether the port ID is equal to j. If the condition of block 1816 is not met, then the method 1800 may proceed to block 1815 where the frame may be discarded. Otherwise, the method 1800 may proceed to block 1820.

At block 1820, a determination may be made as to whether a VLAN_ID of the frame is equal to a VLAN_ID associated with the VF_Port. The VLAN_ID of the frame may be equal to a VLAN_ID in a Q-tag in the frame when the received frame is VLAN-tagged. Alternatively, the VLAN_ID of the frame may be equal to a VLAN_ID assigned to the port by which the frame was received. If the VLAN_ID of the frame does not match the VLAN_ID associated with the VF_Port, then the method 1800 may proceed to block 1815, where frame may be discarded. Otherwise, the method 1800 may proceed to block 1830 where a determination may be made as to whether the SPMA scheme is used. The SPMA scheme may be used, for example, when the SP flag is set to about one. If the condition in block 1830 is met, then the method 1800 may proceed to block 1840 (see FIG. 17B). Otherwise, the method 1800 may proceed to block 1835 (see FIG. 17B).

At block 1835 in FIG. 17A, a determination may be made as to whether the first about 24 bits of the SMAC address of the frame matches a MAC Address Prefix (MAP) assigned to the CPC and whether a S_ID in the frame matches the last about 24 bits of the SMAC address of the frame. If the condition at block 1835 is not met, then the method 1800 may proceed to block 1869, where the frame may be discarded. Otherwise, the method 1800 may proceed to block 1850.

At block 1840 a determination may be made as to whether the Station_ID in the S_ID in the frame matches an entry in a VN_Port MAC Table, such as the VN_Port MAC Table 700. If the Station_ID in the S_ID does not match an entry in the VN_Port MAC Table, then the VN_Port that sent the frame may not be registered. As such, the method 1800 may proceed to block 1869, where the frame may be discarded. Otherwise, the method 1800 may proceed to block 1845 where a source VN_Port MAC address, referred to as My-MAC, may be obtained from the VN_Port MAC Table using the S_ID. The method 1800 may then proceed to block 1846, where a determination may be made as to whether the SMAC of the frame is equal to the VN_Port MAC. If the condition of block 1846 is not met, then the method 1800 may proceed to block 1869, where the frame may be discarded. Otherwise, the method 1800 may proceed to block 1850.

At block 1850, a determination may be made as to whether the VSAN_ID matches an entry in a Switch_ID Table, such as the Switch_ID Table 800. If the VSAN_ID does not match an entry in the Switch_ID Table, then the virtual switch of the VSAN may not exist. As such, the method 1800 may proceed to block 1869, where the frame may be discarded. Otherwise, the method 1800 may proceed to block 1855 where a Domain_ID, referred to as My-Domain_ID, may be obtained from the Switch_ID Table using the VSAN_ID. The method 1800 may then proceed to block 1856, where a determination may be made as to whether the Domain_ID in the S_ID of the frame is equal to the obtained Domain_ID (e.g. My-Domain_ID). If the condition of block 1856 is not met, then the method 1800 may proceed to block 1869, where the frame may be discarded. Otherwise, the method 1800 may proceed to block 1857 where a determination may be made as to whether a Domain_ID in a D_ID of the frame is equal to the obtained Domain_ID (e.g. My-Domain_ID). If the condition of block 1857 is met, then the destination of the frame may be local. As such, the method 1800 may proceed to block 1860. Otherwise, the destination of the frame may be remote, and the method 1800 may proceed to block 1865.

At block 1860, a determination may be made as to whether a Station_ID in the D_ID of the frame matches an entry in a Destination Station Table, such as the Destination Station Table 900. If the Station_ID does not match an entry in the Destination Station Table, then the destination VN_Port that has an FCID equal to the D_ID may not exist. As such, the method 1800 may proceed to block 1869, where the frame may be discarded. Otherwise, the method 1800 may proceed to block 1861 where a VSAN_ID, e.g. My-VSAN_ID, the Destination CPC-MAC, the Out_Port_ID, the Out_VLAN_ID, and the SP Flag may be obtained from the Destination Station Table using the Station_ID in the D_ID. The method 1800 may then proceed to block 1862, where a determination may be made as to whether the obtained VSAN_ID (e.g. My-VSAN_ID) is equal to the VSAN_ID of the frame. If the condition of block 1862 is not met, then the S_ID and D_ID may not belong to the same VSAN, and the method 1800 may proceed to block 1869, where the frame may be discarded. Otherwise, the method 1800 may proceed to block 1870.

At block 1865, a determination may be made as to whether the VSAN_ID and the Domain_ID in the D_ID of the frame match an entry in a Remote Switch Table, such as the Remote Switch Table 1000. If the condition of block 1865 is not met, then the remote switch may not exist. As such, the method 1800 may proceed to block 1869, where the frame may be discarded. Otherwise, the method 1800 may proceed to block 1870 where the frame may be modified and sent to the ESF. For instance, the frame may be modified as shown in FIG. 15 and formatted similar to the FCoE Frame Format 1700. Specifically, the DMAC of the frame may be replaced by the CPC-MAC of the internal port of the egress CPC, e.g. CPC-MAC(k,h), and the SMAC of the frame may be replaced by the CPC-MAC of the internal port of the ingress CPC, e.g. CPC-MAC(i,j). The Q-tag of the frame may also be replaced by a new Q-tag comprising a VLAN_ID equal to VLAN-F. Additionally, the Out_VLAN_ID, the VSAN_ID, the Out_Port_ID, a SP flag, and an L flag may be inserted into the corresponding fields of the frame. The L flag may be set to about one when the frame is local or set to about zero when the frame is remote. The method 1800 may then end.

In the method 1800 above, the procedures of blocks 1805 to 1855 may be implemented to parse, validate, and process the received FCoE frame, and to obtain a VSAN_ID of the frame. The procedures of blocks 1856, 1857, 1860, 1861, 1862, and 1865 may be used to make the forwarding decision for the frame based on the obtained VSAN_ID and to forward the frame accordingly. In an embodiment, if the CPC does not support the SPMA scheme, then the frame may be forwarded in the ingress direction without using the VN_Port MAC Table. In the case that only one VLAN ID is used by the CPC to support FCoE, the VLAN_ID in the Source Station Table may not be needed. Further, in the case of a one-to-one relationship between the front-panel port and the internal port of the CPC, such as in the case of symmetric CPCs being used by the FCoE switch 100, the Out_Port_ID may not be needed to forward the frame.

Figure 18:
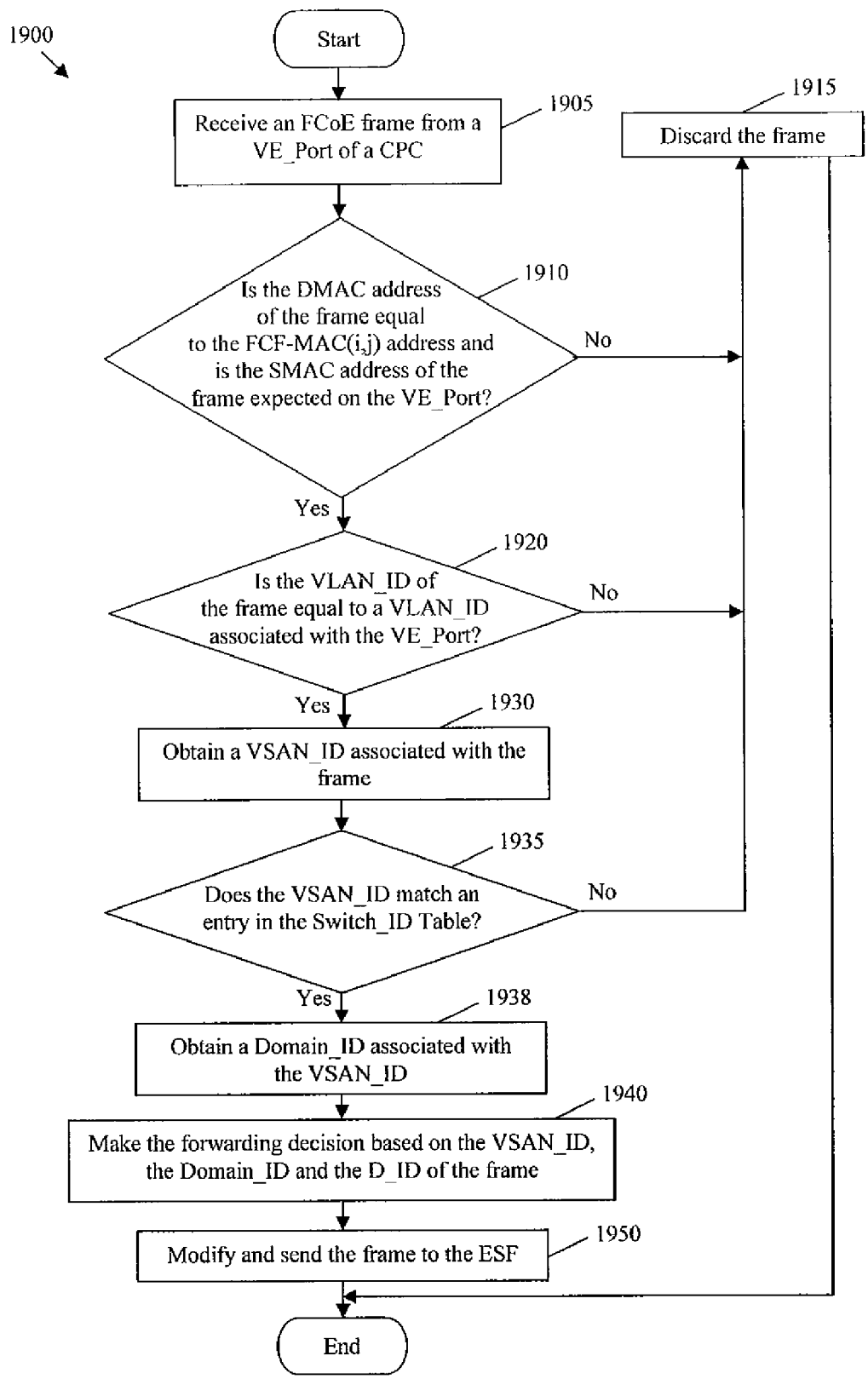
FIG. 18 is a flowchart of an embodiment of an FCoE frame forwarding method for a VE_Port.

FIG. 18 illustrates another embodiment of an FCoE frame forwarding method 1900, which may be used to forward the frames in the ingress direction from the CPC (e.g. CPC 120, FCoE CPC 220a, or FCoE CPC 400) to the ESF. The frames forwarded as described in the method 1900 may be FCoE frames received by a front-panel FCoE port configured as a VE_Port. The FCoE frame forwarding method 1900 may start at block 1905, where an FCoE frame may be received at a VE_Port of the CPC. The method 1900 may then proceed to block 1910, where a determination may be made as to whether a DMAC address of an FCoE frame received by the VE_Port is equal to an FCF-MAC(i,j) address, and whether the SMAC address of the frame is expected on the VE_Port. If the condition of block 1910 is not met, then the method 1900 may proceed to block 1915, where the frame may be discarded and the method 1900 may end. Otherwise, the method 1900 may proceed to block 1920.

At block 1920, a determination may be made as to whether the VLAN_ID of the frame is equal to a VLAN_ID associated with the VE_Port. The VLAN_ID of the frame may be equal to the VLAN_ID in a Q-tag in the frame when the frame is VLAN-tagged, or alternatively to a VLAN _ID assigned to the FCoE port. If the VLAN_ID of the frame does not match the VLAN_ID associated with the VE_Port, then the method 1900 may proceed to block 1915, where frame may be discarded. Otherwise, the method 1900 may proceed to block 1930 where a VSAN_ID that is associated with the frame may be obtained. If the frame comprises a VFT_header, then the VSAN_ID may be equal to the VSAN_ID in the VFT_header. If the frame does not comprise the VFT_header, then the VSAN_ID may be equal to a default VSAN_ID assigned to the port.

The method 1900 may then proceed to block 1935, where a determination may be made as to whether the VSAN_ID matches an entry in the Switch_ID Table, such as the Switch_ID Table 800. If the VSAN_ID does not match an entry in the Switch_ID Table, then the method 1900 may proceed to block 1915, where the frame may be discarded. Otherwise, the method 1900 may proceed to block 1938 where a Domain_ID, referred to as My-Domain_ID, may be obtained from the Switch_ID Table using the VSAN_ID. The method 1900 may then proceed to block 1940, where a forwarding decision may be made for the frame based on the VSAN_ID, a Domain_ID (e.g. My-Domain_ID), and a D_ID of the frame, for instance using procedures similar to those described in blocks 1856, 1857, 1860, 1861, 1862, and 1865. The method 1900 may then proceed to block 1950, where the frame may be modified and sent to the ESF, for instance using a procedure similar to that described in block 1870 above.

Figure 19:
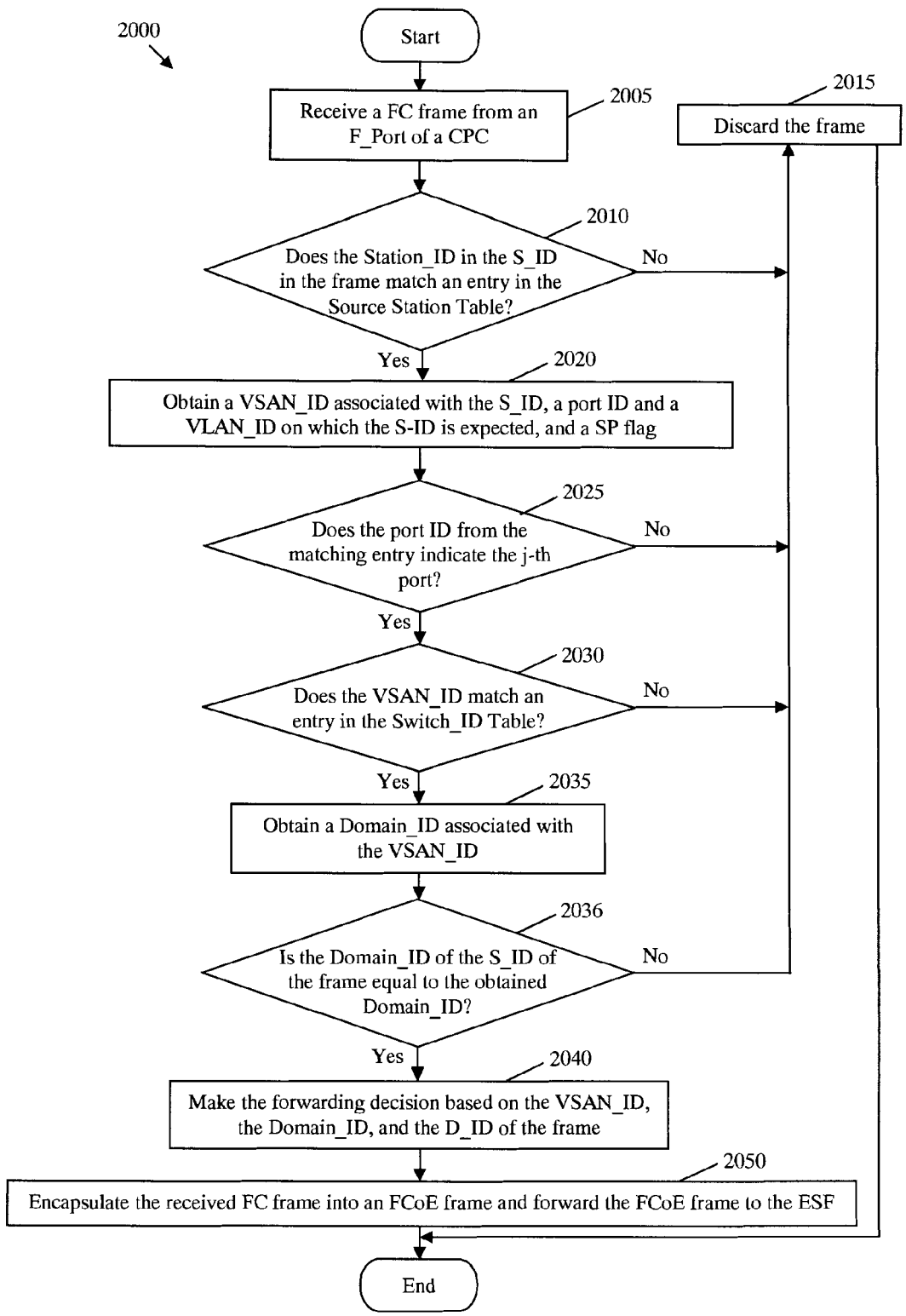
FIG. 19 is a flowchart of an embodiment of an FC frame forwarding method for an F_Port.

FIG. 19 illustrates one embodiment of an FC frame forwarding method 2000, which may be used to forward the frames in the ingress direction from a CPC to an ESF. For instance, the FC frame forwarding method 2000 may be performed by the CPC (e.g. CPC 120, FC CPC 220b, or FC CPC 500). The frames forwarded as described by the method 2000 may be FC frames received by a front-panel FC port configured as an F_Port. The FC frame forwarding method 2000 may start at block 2005, where an FC frame may be received at an F_Port of the CPC. The method 2000 may then proceed to block 2010, where a determination may be made as to whether a Station_ID in the S_ID in the frame matches an entry in a Source Station Table, such as the Source Station Table 600. If the Station_ID in the S_ID does not match an entry in the Source Station Table, then the VN_Port that sent the frame may not be registered. As such, the method 2000 may proceed to block 2015, where the frame may be discarded and the method 2000 may end. Otherwise, the method 2000 may proceed to block 2020.

At block 2020, a VSAN_ID (e.g. My-VSAN_ID), a port ID (e.g. In_Port_ID) and a VLAN_ID on which the S_ID is expected, and a SP flag may be obtained from the Source Station Table using the Station_ID in the S_ID. The method 2000 may then proceed to block 2025, where a determination may be made as to whether the port ID indicates the j-th port. If the condition of block 2025 is not met, then the method 2000 may proceed to block 2015 where the frame may be discarded. Otherwise, the method 2000 may proceed to block 2030 where a determination may be made as to whether the VSAN_ID matches an entry in a Switch_ID Table, such as the Switch_ID Table 800. If the VSAN_ID does not match an entry in the Switch_ID Table, then the method 2000 may proceed to block 2015, where the frame may be discarded. Otherwise, the method 2000 may proceed to block 2035.

At block 2035 a Domain_ID (e.g. My-Domain_ID) may be obtained from the Switch_ID Table using the VSAN_ID, e.g. My-VSAN_ID. The method 2000 may then proceed to block 2036, where a determination may be made as to whether a Domain_ID of the S_ID of the frame is equal to the obtained Domain_ID. If the condition of block 2036 is not met, then the method 2000 may proceed to block 2015, where the frame may be discarded. Otherwise, the method 2000 may proceed to block 2040 where a forwarding decision for the frame may be made based on the VSAN_ID, the Domain_ID (e.g. My-Domain_ID), and the D_ID of the frame, for instance using procedures similar to those described in block 1856, 1857, 1860, 1861, 1862, and 1865. The method 2000 may then proceed to block 2050, where the received FC frame may be encapsulated into an FCoE frame, for instance similar to the FCoE frame format 1700, and forwarded to the ESF. The FCoE frame may comprise a DMAC equal to the CPC-MAC (k,h), a SMAC equal to CPC-MAC(i,j), and a VLAN_ID equal to the VLAN-F.

Figure 20:
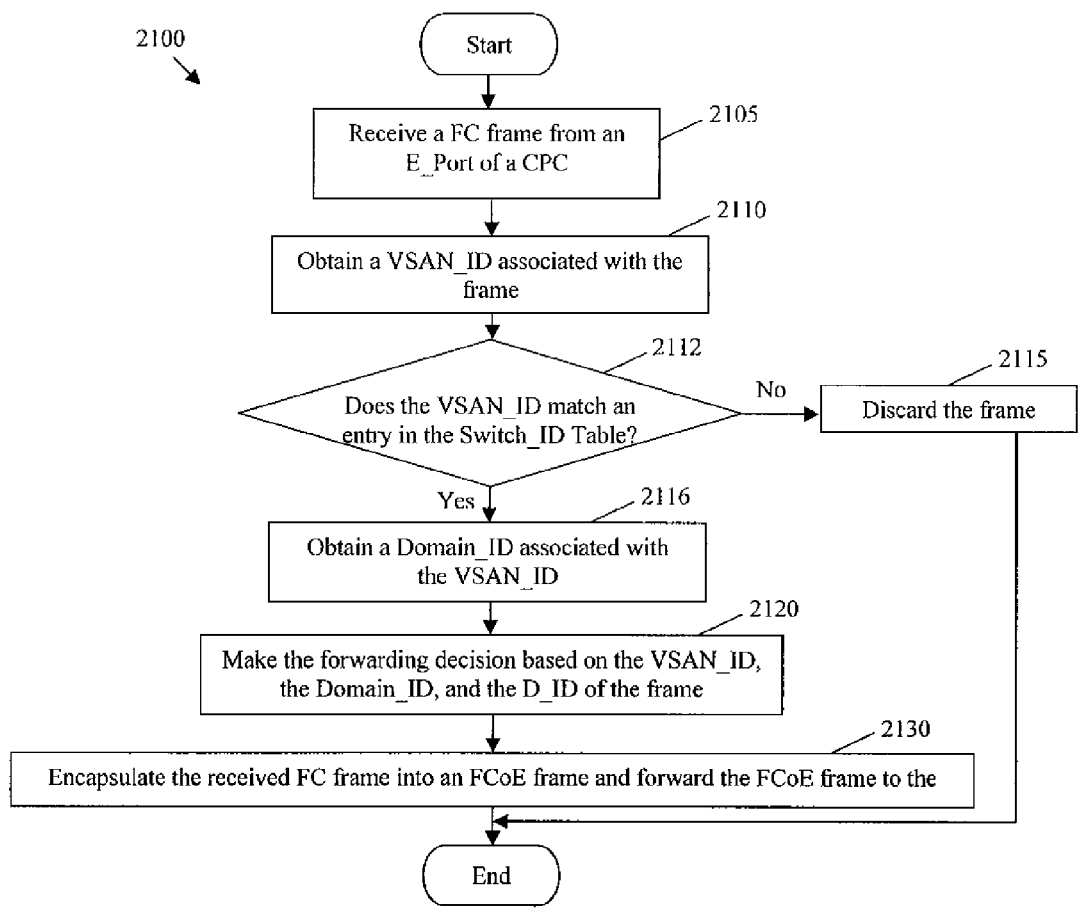
FIG. 20 is a flowchart of an embodiment of an FC frame forwarding method for an E_Port.

FIG. 20 illustrates another embodiment of an FC frame forwarding method 2100, which may be used to forward the frames in the ingress direction from a CPC to an ESF, for instance by the CPC (e.g. CPC 120, FC CPC 220b, or FC CPC 500). The frames forwarded as described by the method 2100 may be FC frames received by a front-panel FC port configured as an E_Port. The FC frame forwarding method 2100 may start at block 2105, where an FC frame may be received at an E_Port of the CPC. The method 2100 may then proceed to block 2110, where a VSAN_ID that is associated with the frame may be obtained. If the frame comprises a VFT_header, then the VSAN_ID may be equal to the VSAN_ID in the VFT_header. If the frame does not comprise the VFT_header, then the VSAN_ID may be equal to a default VSAN_ID assigned to the port.

The method 2100 may then proceed to block 2112, where a determination may be made as to whether the VSAN_ID matches an entry in a Switch_ID Table, such as the Switch_ID Table 800. If the VSAN_ID does not match an entry in the Switch_ID Table, then the virtual switch of the VSAN may not exist. As such, the method 2100 may proceed to block 2115, where the frame may be discarded and the method 2100 may end. Otherwise, the method 2100 may proceed to block 2116 where a Domain_ID (e.g. referred to as My-Domain_ID) may be obtained from the Switch_ID Table using the VSAN_ID. The method 2100 may then proceed to block 2120, where the forwarding decision for the frame may be made based on the VSAN_ID, a Domain_ID (e.g. My-Domain_ID), and a D_ID of the frame, for instance using procedures similar to those described in blocks 1856, 1857, the h-th port of a k-th CPC, process the frame, and transmit the frame on a front-panel port associated with the internal port. In an embodiment, the CPC may process the FCoE frame using a plurality of procedures described in the pseudo-code below.

```
if (flag L==1) {                    # local #
    if ((output_port == FCoE) && (port_type == VF_Port)) {      # FCoE port #
        if (address mode == FPMA) {         #SP flag = 0#
            construct a new FCoE frame with DMAC=destination VN_Port MAC,
                SMAC=FCF-MAC(k,h) and VLAN_ID = Out_VLAN_ID;        # VN_Port MAC = MAP + D_ID. VLAN_ID is used if Q-tag is enabled for FCoE frames #
        }
        else {              # SPMA #
            find destination VN_Port MAC via lookup of VN_Port MAC Table in FIG. 7;
            if (a VN_Port MAC is found) {
                construct a new FCoE frame with DMAC=destination VN_Port MAC and
                    SMAC=FCF-MAC(k,h) and VLAN_ID = Out_VLAN_ID;        # remove the VFT_header if any. VLAN_ID is used if Q-tag is enabled for FCoE frames #
            }
            else {
                discard the frame;
            }
        }
    }
    else if ((output_port == FC) && (port_type == F_Port)) {       # FC port #
        construct a new FC frame from the FCoE frame;              # remove the VFT_header if any #
    }
    else {      # invalid port type #
        discard the frame;
    }
}
else {           # remote #
    if ((output_port == FCoE) && (port_type == VE_Port)) {      # FCoE port #
        find remote FCF-MAC address via lookup of Switch MAC Table in FIG. 11;
        if (a FCF-MAC is found) {
            construct a new FCoE frame with DMAC=remote FCF-MAC, SMAC=FCF-MAC(k,h) and
                VLAN_ID = obtained VLAN_ID;          # if Q-tag is used for FCoE frames #
            if (VSAN enabled) {
                insert a VFT_header in the encapsulated FC frame if it doesn't exist & recalculate the
                FCS for the FC frame;
            }
        }
        else {
            discard the frame;
        }
    }
    else if ((output_port == FC) && (port_type == E_Port)) {       # FC port #
        construct a new FC frame from the FCoE frame;
        if (VSAN enabled) {
            insert a VFT_header to the new FC frame if it doesn't exist & recalculate the
            FCS for the FC frame;
        }
    }
    else {            # invalid port type #
        discard the frame;
    }
}
```

1860, 1861, 1862, and 1865. The method 2100 may then proceed to block 2130, where the received FC frame may be encapsulated into an FCoE frame, for instance similar to the FCoE frame format 1700, and forwarded to the ESF. The FCoE frame may comprise a DMAC equal to the CPC-MAC (k,h), a SMAC equal to CPC-MAC(i,j), and a VLAN_ID equal to the VLAN-F.

The CPC frame forwarding methods described above may be implemented on frames received by front-panel ports in the ingress direction. Additionally, the CPC may receive FCoE frames from the ESF in the egress direction. The ESF may forward the FCoE frames based on the DMAC and VLAN_ID, such as the VLAN-F for FCoE. The CPC may receive an FCoE frame from the ESF by an internal port, e.g.

In an embodiment, when a new FCoE frame is generated, for instance using the pseudo-code above, the VLAN_ID in the Q-tag of the frame received from the ESF may be replaced by a VLAN_ID associated with the FCoE on the port. If the egress port is a VF_Port, the VLAN_ID may be the Out_VLAN_ID carried in the FCoE frame payload. If the egress port is a VE_Port, the VLAN_ID may be the obtained VLAN_ID from the Remote Switch MAC Table 1200. Further, if the CPC supports only the FPMA scheme, then the VN_Port MAC Table may not be need to forward the frame in the egress direction. Further, if there are two or more remote FCoE switches (i.e. next hops) that a frame can be forwarded to in order to reach the destination, the entry in the Remote Switch MAC Table would contain a pointer which points to a list of FCF-MAC addresses. A similar approach used for the Remote Switch Table can be used here to select an FCF-MAC.

In an embodiment, if the CPC supports more than about 65,535 ports, then the CPC may use the same Station_ID for more than one VN_Ports. As such, the S_ID may be used to find matching entries in both the Source Station Table and the VN_Port MAC Table. Additionally, the D_ID may be used to find a matching entry in both the Destination Station Table and the VN_Port MAC Table. The concept of short S_ID and short D_ID describe below may be used to reduce the table size. Further, if the CPC is configured to forward the frames received from the VN_Ports using a VFT_header, then the frames received at the F_Ports or VF_Ports may also comprise the VFT_header. Accordingly, the CPC may compare the VSAN_ID in the VFT_header with the VSAN_ID in the Source Station Table.

In some cases, the same CPC may forward the received frames to the ESF in the ingress direction and then receive the same frames from the ESF in the egress direction, for instance when the frames are switched back by the ESF. In an embodiment, the CPC may be configured to switch locally such frames instead of the ESF. For instance, the CPC may use logic to determine whether the DMAC of the received frames, which may be FCoE frames, corresponds to the same CPC. If the DMAC of the frames corresponds to the same CPC, then the frames may be switched internally using a frame forwarding method in the egress direction instead of forwarding the frames to the ESF. Otherwise, the frames may be forwarded in the ingress direction to the ESF.

Figure 21A:
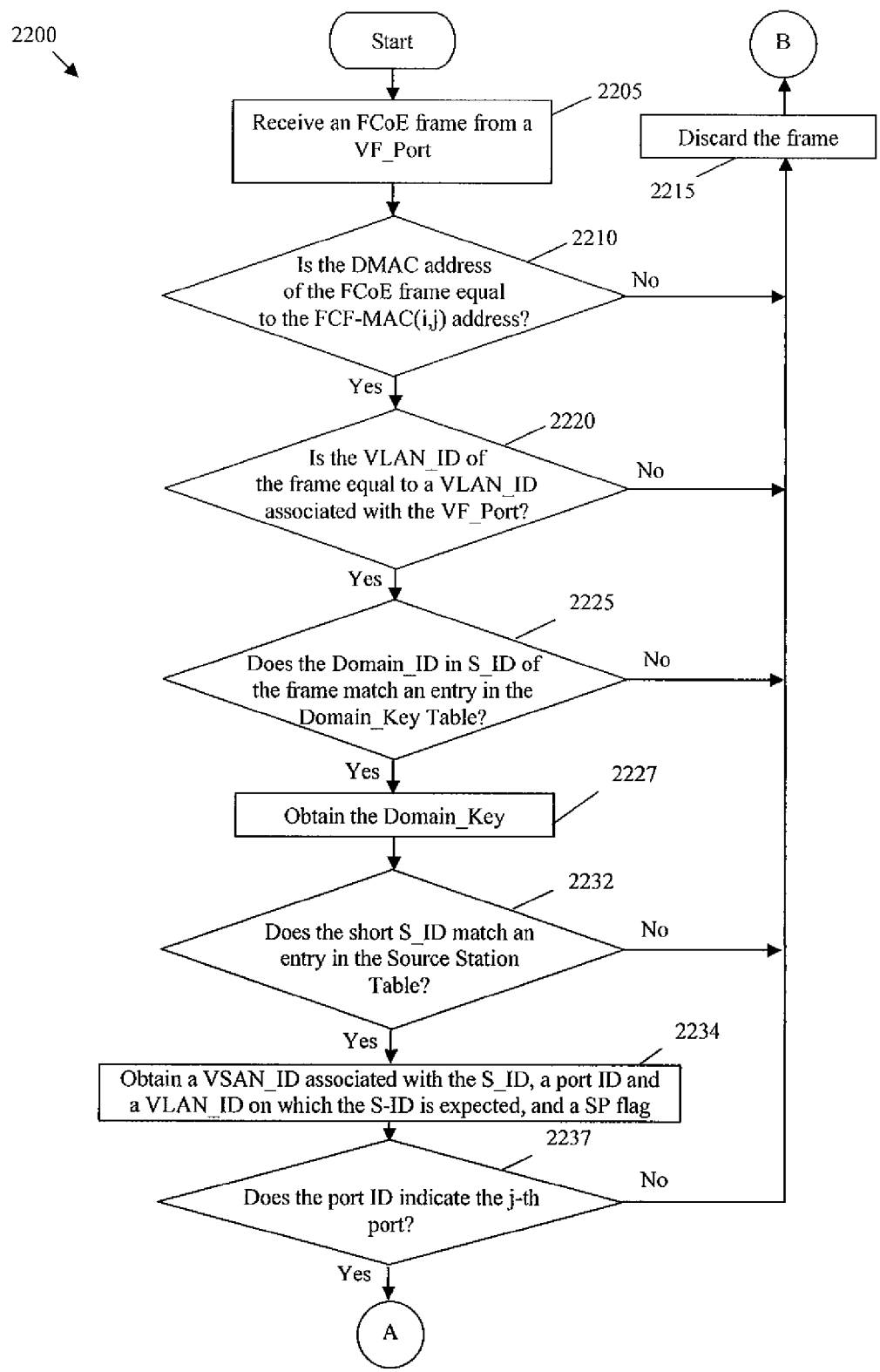
FIGS. 21A and 21B are a flowchart of an embodiment of an FCoE frame forwarding method for a VF_Port operating in an N_Port Virtualizer (NPV) mode.
Figure 21B:
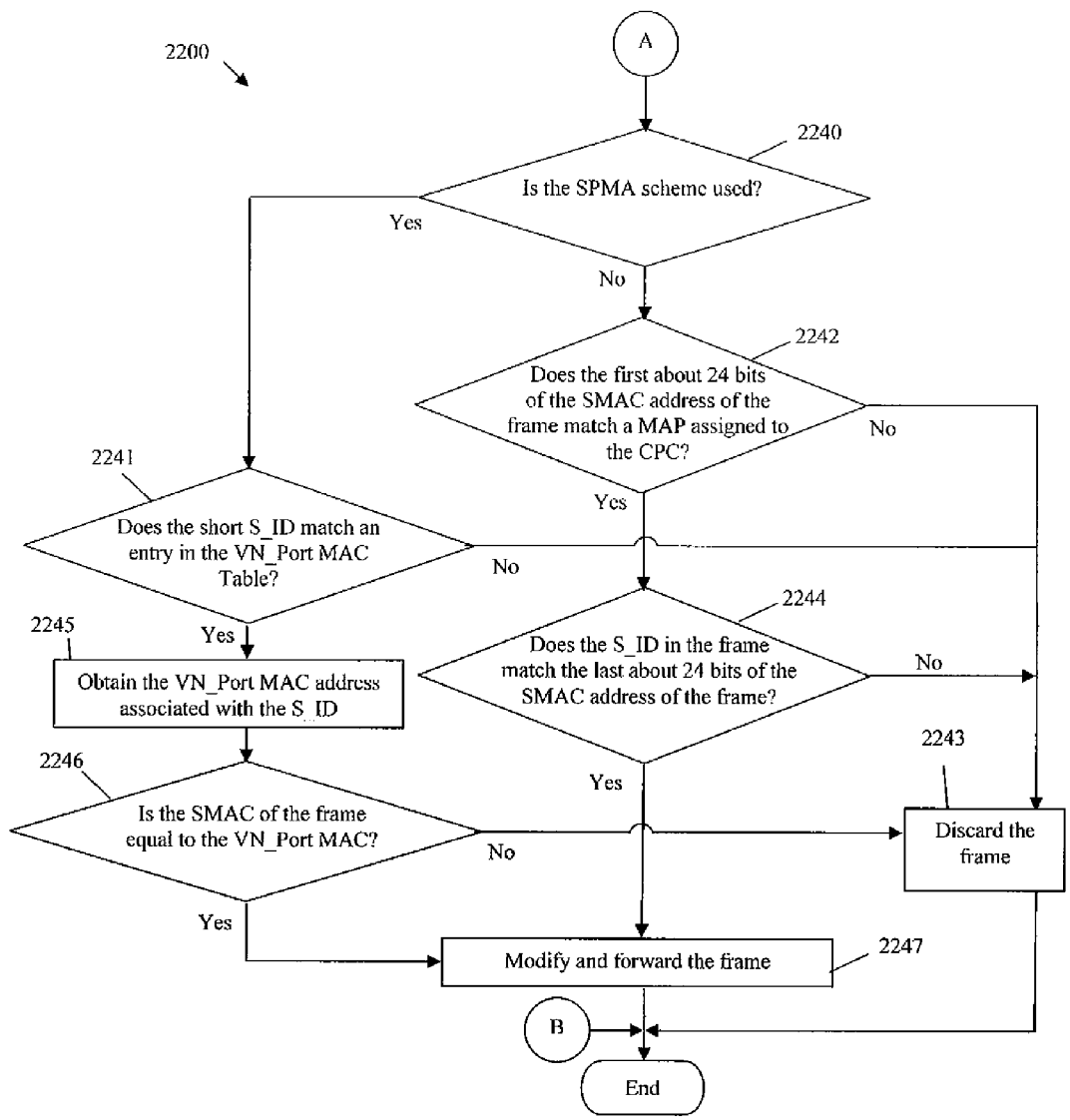

FIGS. 21A and 21B illustrate an embodiment of an FCoE frame forwarding method 2200, which may be used to forward the frames in the ingress direction in the NPV mode. The FCoE frame forwarding method 2200 may be performed by an FCoE switch operating in the NPV mode (e.g. the first FCoE switch 310) when the FCoE frame is received by an FCoE VF_Port (e.g. a server facing port 313 configured as VF_Port).

The FCoE frame forwarding method 2200 may start at block 2205 in FIG. 21A, where an FCoE frame may be received at the VF_Port. The method 2200 may then proceed to block 2210, where a determination may be made as to whether a DMAC address of an FCoE frame received by the VF_Port is equal to an FCF-MAC(i,j) address assigned to the j-th port of the i-th CPC. If the DMAC address does not match the FCF-MAC(i,j) address, then the method 2200 may proceed to block 2215, where the frame may be discarded and the method 2200 may end. Otherwise, the method 2200 may proceed to block 2220 where a determination may be made as to whether a VLAN_ID of the frame is equal to a VLAN_ID associated with the FCF-MAC(i,j) address of a server facing port associated with the VF_Port. The VLAN_ID of the frame may be equal to a VLAN_ID in a Q-tag in the frame when the received frame is VLAN-tagged. Alternatively, the VLAN_ID of the frame may be equal to a VLAN_ID assigned to the port by which the frame was received. If the VLAN_ID of the frame does not match the VLAN_ID associated with the VF_Port, then the method 2200 may proceed to block 2215, where frame may be discarded. Otherwise, the method 2200 may proceed to block 2225.

At block 2225, a determination may be made as to whether the Domain_ID in the S_ID of the frame matches an entry in a Domain_Key Table, such as the Domain_Key Table 1300. If the condition of block 2225 is not met, then the method 2200 may proceed to block 2215, where the frame may be discarded and the method 2200 may end. Otherwise, the method 2200 may proceed to block 2227, where a Domain_Key may be obtained from the Domain_Key Table. The method 2200 may then proceed to block 2232, where a determination may be made as to whether a short S_ID (Domain_Key plus the Station_ID in S_ID) matches an entry in a Source Station Table, such as the Source Station Table 1400. If the short S_ID does not match an entry in the Source Station Table, then the VN_—Port that sent the frame may not be registered. As such, the method 2200 may proceed to block 2215, where the frame may be discarded. Otherwise, the method 2200 may proceed to block 2234, where a VSAN_ID (e.g. My-VSAN_1D), a port ID (e.g. In Port_ID) and a VLAN_ID on which the S_ID is expected, and a SP flag may be obtained from the Source Station Table using the short S_ID. The method 220 may then proceed to block 2237, where a determination may be made as to whether the port ID indicates the j-th port. If the condition of block 2237 is not met, then the method 2200 may proceed to block 2215, where the frame may be discarded and the method 2200 may end. Otherwise, the method 2200 may proceed to block 2240 (See FIG. 21B).

At block 2240, a determination may be made as to whether the SPMA scheme is used. The SPMA scheme may be used, for example, when the SP flag is set to about one. If the condition in block 2240 is met, then the method 2200 may proceed to block 2241. Otherwise, the method 2200 may proceed to block 2242, where a determination may be made as to whether the first about 24 bits of a SMAC address of the frame matches a MAP assigned to the CPC. If the condition in block 2242 is not met, then the method 2200 may proceed to block 2243, where the frame may be discarded. Otherwise, the method 2200 may proceed to block 2244, where a determination may be made as to whether a S_ID in the frame matches the last about 24 bits of the SMAC address of the frame. If the S_ID does not match the last about 24 bits of the MAC address, then the method 2200 may proceed to block 2243, where the frame may be discarded. Otherwise, the method 2200 may proceed to block 2247.

At block 2241, a determination may be made as to whether the short S_ID matches an entry in a VN_Port MAC Table, such as the VN_Port MAC Table 700. If the short S_ID does not match an entry in the VN_Port MAC Table, then the VN_Port that sent the frame may not be registered. As such, the method 2200 may proceed to block 2243, where the frame may be discarded. Otherwise, the method 2200 may proceed to block 2245 where a source VN_Port MAC address (e.g. My-MAC) associated with the S_ID may be obtained from the VN_Port MAC Table. The method 2200 may then proceed to block 2246, where a determination may be made as to whether the SMAC of the frame is equal to the VN_Port MAC. If the condition of block 2246 is not met, then the method 2200 may proceed to block 2243, where the frame may be discarded. If the condition of block 2246 is met, then the method 2200 may proceed to block 2247.

At block 2247, the frame may be modified and forwarded to the ESF, e.g. ESF 110. For instance, the frame may be formatted similar to the FCoE Frame Format 1700, where the DMAC of the frame may be replaced by the egress CPC internal port (e.g., CPC-MAC(k,h)), the SMAC of the frame may be replaced by the ingress CPC internal port (e.g., CPC-MAC(i,j)). Additionally, the Q-tag and VLAN_ID of the frame may be replaced with a new Q-Tag in which the VLAN_ID is equal to VLAN-F, and the Out_Port_ID, a SP flag and an L flag set to about zero may be added to the corresponding fields of the frame, for instance using a procedure similar to the method 1800. The Out_VLAN_ID and VSAN_ID may be irrelevant and the VN_Port MAC field may be filled by the obtained VN_Port MAC address if the SP flag is about one. The destination CPC-MAC and the Out_

Port_ID may be preconfigured for the FCoE port. The Out_Port_ID may be used when more than one front-panel port is associated with the CPC-MAC. Further, the VF_Port may be configured to support the FPMA scheme, the SPMA scheme, or both as described above.

Figure 22:
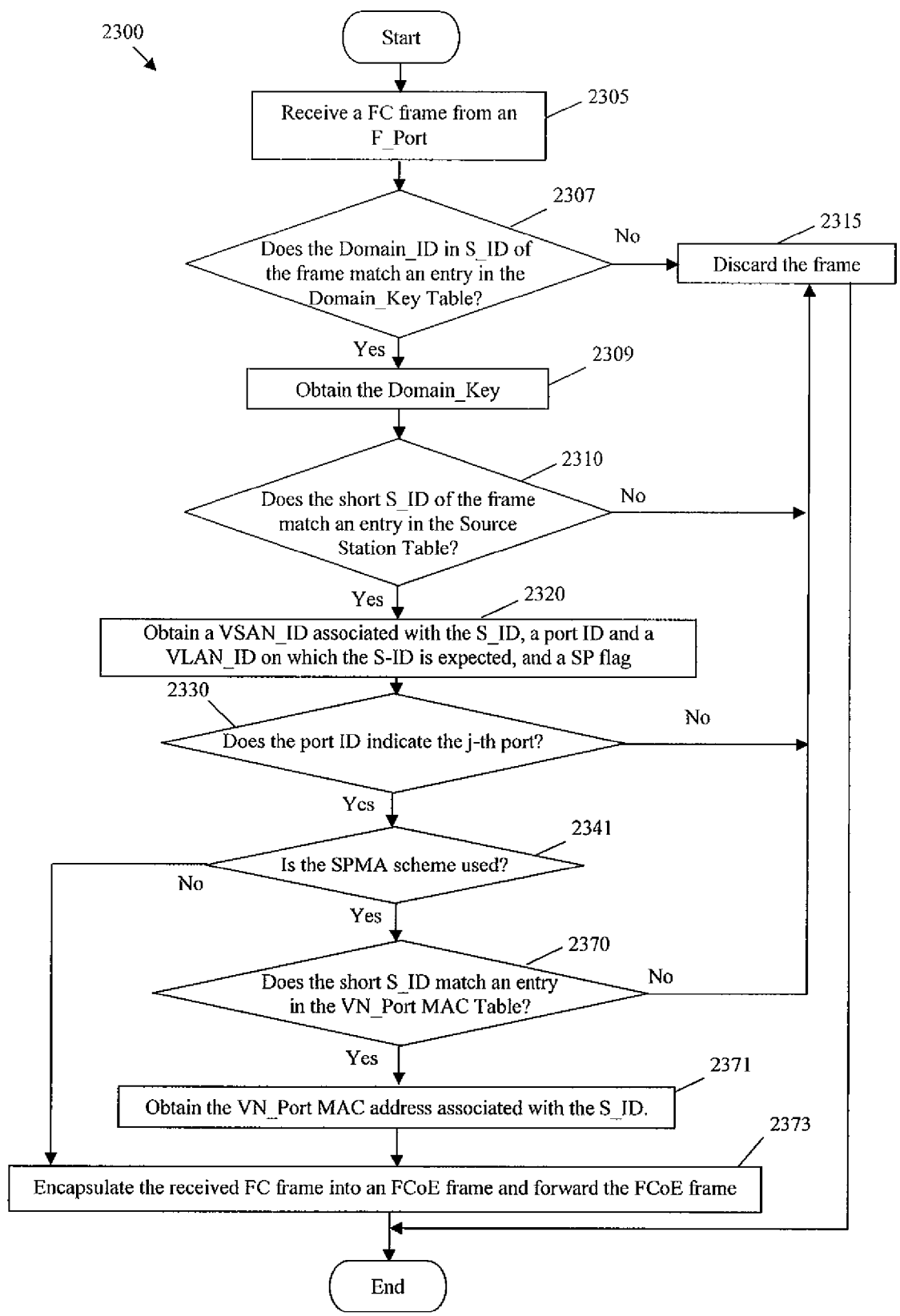
FIG. 22 is a flowchart of an embodiment of an FC frame forwarding method for an F_Port operating in a NPV mode.

FIG. 22 illustrates an embodiment of an FC frame forwarding method 2300, which may be used to forward the frames in the ingress direction in the NPV mode. The FC frame forwarding method 2300 may be performed by an FCoE switch operating in the NPV mode (e.g. the first FCoE switch 310) when the FC frame is received by an F_Port (e.g. server facing port 314 configured as F_Port) and forwarded to an N_Port.

The FC frame forwarding method 2300 may start at block 2305, where an FC frame may be received at the F_Port. The method 2300 may proceed to block 2307, where a determination may be made as to whether the Domain_ID in the S_ID of the frame matches an entry in a Domain_Key Table, such as the Domain_Key Table 1300. If the condition of block 2307 is not met, then the method 2300 may proceed to block 2315, where the frame may be discarded and the method 2300 may end. Otherwise, the method 2300 may proceed to block 2309, where a Domain_Key may be obtained from the Domain_Key Table. The method 2300 may then proceed to block 2310, where a determination may be made as to whether the short S_ID (Domain_Key plus the Station_ID of S_ID) matches an entry in a Source Station Table, such as the Source Station Table 1400. If the short S_ID does not match an entry in the Source Station Table, then the VN_Port that sent the frame may not be registered. As such, the method 2300 may proceed to block 2315, where the frame may be discarded and the method 2300 may end. Otherwise, the method 2300 may proceed to block 2320.

At block 2320, a VSAN_ID (e.g. My-VSAN_ID), a port ID (e.g. In_Port_ID) and a VLAN_ID on which the S_ID is expected, and a SP flag may be obtained from the Source Station Table using the short S_ID. The method 2300 may then proceed to block 2330 where a determination may be made as to whether the port ID indicates the j-th port, e.g. is equal to j. If the condition of block 2330 is not met, then the method 2300 may proceed to block 2315, where the frame may be discarded. Otherwise, the method 2300 may proceed to block 2341, where a determination may be made as to whether the SPMA scheme is used. The SPMA scheme may be used, for example, when the SP flag is set to about one. If the condition in block 2341 is not met, then the method 2300 may proceed to block 2373. Otherwise, the method 2300 may proceed to block 2370. At block 2370, a determination may be made as to whether the short S_ID matches an entry in a VN_Port MAC Table, such as the VN_Port MAC Table 700. If the short S_ID does not match an entry in the VN_Port MAC Table, then the VN_Port that sent the frame may not be registered. As such, the method 2300 may proceed to block 2315, where the frame may be discarded. Otherwise, the method 2300 may proceed to block 2371.

At block 2371, a source VN_Port MAC address (e.g. My-MAC) associated with the S_ID may be obtained from the VN_Port MAC Table. The method may then proceed to block 2373, where the received FC frame may be encapsulated, for instance into an FCoE frame similar to the FCoE frame format 1700. As such, the DMAC of the frame may be equal to the CPC-MAC(k,h), the SMAC of the frame may be equal to the CPC-MAC of the ingress CPC internal port (e.g., CPC-MAC(i,j)), and the VLAN_ID may be set to VLAN-F. Additionally, an Out_Port_ID, a SP flag and an L flag set to about zero may be added to the corresponding fields of the frame. The VSAN_ID and the Out_VLAN_ID in the newly formed frame may be irrelevant and/or may be set to about zero. The VN_MAC address 1716 is filled with the obtained VN_MAC address if the SP flag is one. The frame may then be forwarded to the ESF.

Figure 23:
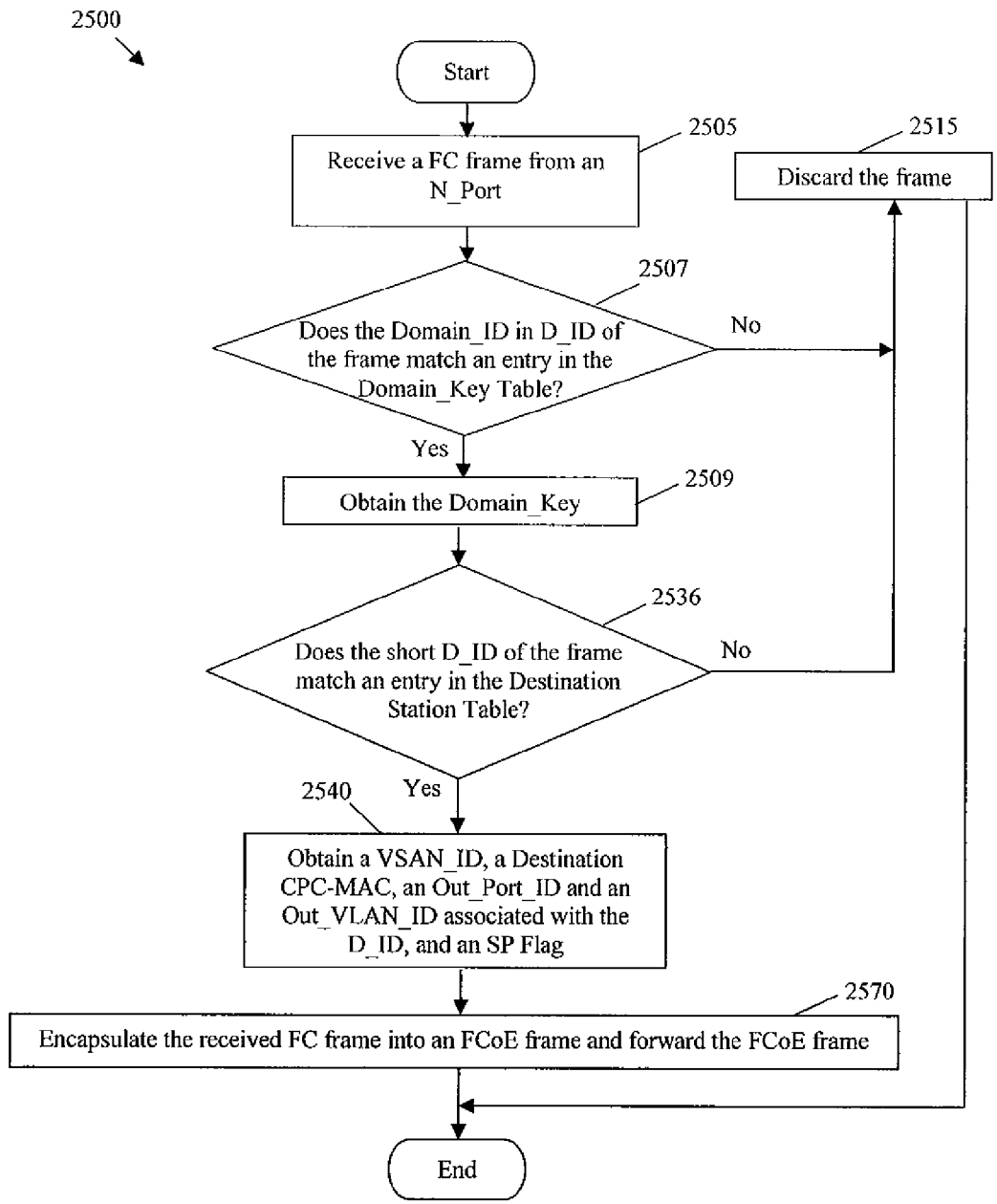
FIG. 23 is a flowchart of an embodiment of an FC frame forwarding method for an N_Port operating in a NPV mode.

FIG. 23 illustrates another embodiment of an FC frame forwarding method 2500, which may be used to forward the frames in the ingress direction in the NPV mode. The FC frame forwarding method 2500 may be performed by an FCoE switch operating in the NPV mode, such as the first FCoE switch 310, when the FC frame is received by an N_Port (e.g. network facing port 311 configured as N_Port). It will be appreciated that when forming an FCoE frame, the DMAC may be equal to the CPC-MAC(k,h), the SMAC may be equal to the CPC-MAC(i,j), and the Out_VLAN_ID may be irrelevant. In addition, the VN_Port MAC field in the FCoE Frame Format 1700 may be irrelevant and/or may be set to about zero. The FC frame forwarding method 2500 may start at block 2505, where an FC frame may be received at the N_Port. The method 2500 may proceed to block 2507, where a determination may be made as to whether the Domain_ID in the D_ID of the frame matches an entry in a Domain_Key Table, such as the Domain_Key Table 1300. If the condition of block 2507 is not met, then the method 2500 may proceed to block 2515, where the frame may be discarded and the method 2500 may end. Otherwise, the method 2500 may proceed to block 2509, where a Domain_Key may be obtained from the Domain_Key Table.

The method 2500 may then proceed to block 2536, where a determination may be made as to whether a short D_ID (Domain_Key plus the Station_ID of D_ID) matches an entry in a Destination Station Table, such as the Destination Station Table 1500. If a matching entry is not found in the Destination Station Table, then the destination VN_Port with the FCID equal to the D_ID may not exist or be registered. As such, the method 2500 may proceed to block 2515, where the frame may be discarded and the method 2500 may end. Otherwise, the method 2500 may proceed to block 2540, where the VSAN_ID, the destination CPC-MAC address, the port ID (e.g. Out_Port_ID) and an Out_VLAN_ID associated with the D_ID, and a SP Flag may be obtained from the Destination Station Table, such as the Destination Station Table 1500, using the short D_ID.

The method 2500 may then proceed to block 2570 where the received FC frame may be encapsulated, for instance into an FCoE frame similar to the FCoE frame format 1700. The DMAC of the frame may be replaced with the CPC-MAC(k, h), the SMAC with the CPC-MAC(i,j), and the VLAN_ID with the VLAN-F. The Out_Port_ID, the SP flag and the L flag set to about one may be added to the corresponding fields of the frame. The VSAN_ID, the Out_VLAN_ID and the VN_Port_MAC in the newly formed frame may be irrelevant and/or may be set to about zero. The frame may then be forwarded to the ESF. Note that the destination CPC-MAC and the Out_Port_ID in the Destination Station Table may not be needed if the network facing port has only one server facing port.

Figure 24:
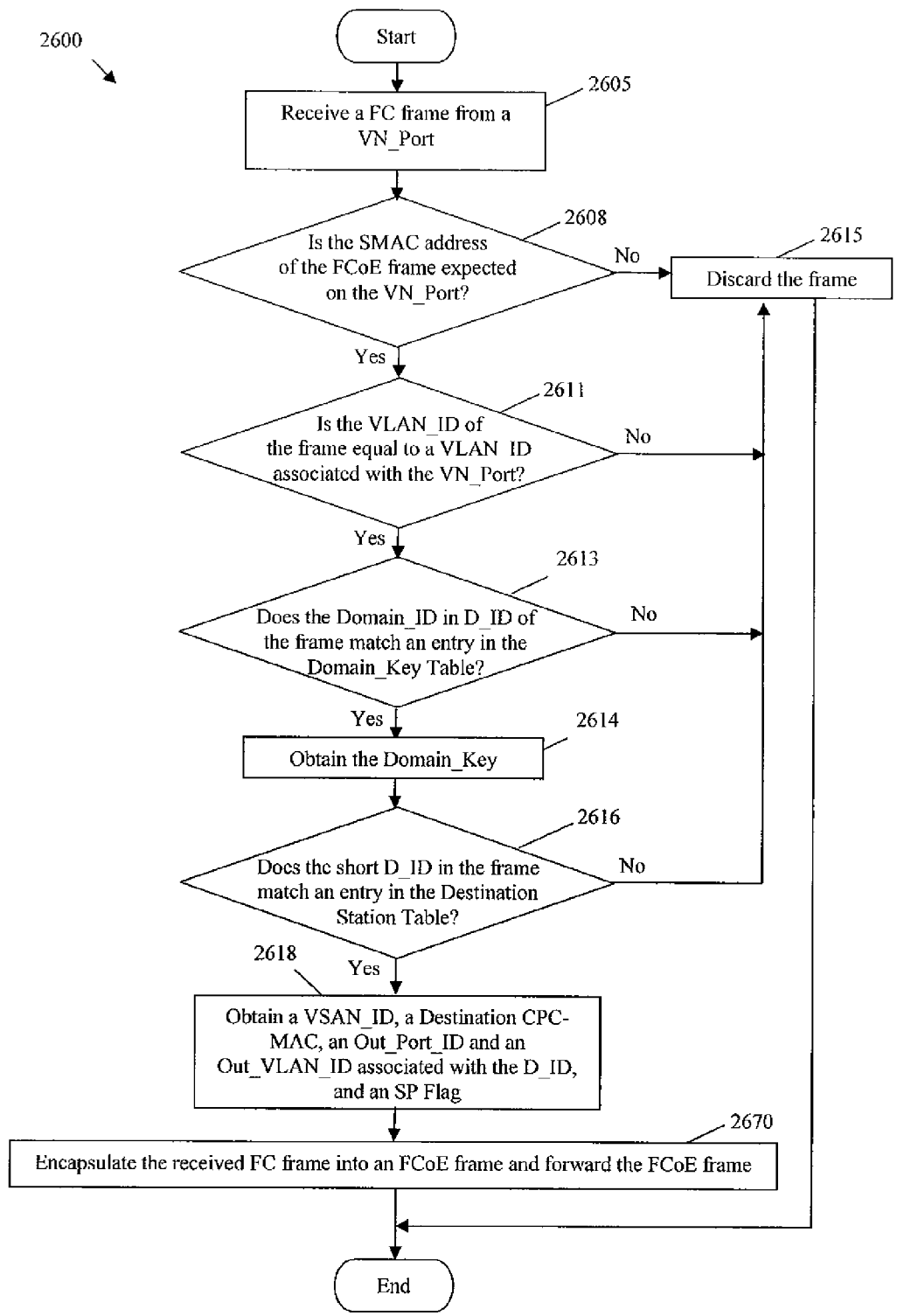
FIG. 24 is a flowchart of an embodiment of an FC frame forwarding method for a VN_Port operating in a NPV mode.

FIG. 24 illustrates another embodiment of an FC frame forwarding method 2600, which may be used to forward the frames in the ingress direction in the NPV mode. The FC frame forwarding method 2600 may be performed by an FCoE switch operating in the NPV mode, such as the first FCoE switch 310, when the FC frame is received by a VN_Port (e.g. a network facing port 312 configured as VN_Port). The FC frame forwarding method 2600 may start at block 2605, where an FC frame may be received at the VN_Port. The method 2600 may then proceed to block 2608, where a determination may be made as to whether the SMAC of the FCoE frame is expected on the VN_Port MAC. If the condition of block 2608 is not met, then the method 2600 may proceed to block 2615, where the frame may be discarded. If the condition of block 2608 is met, then the method 2600 may proceed to block 2611.

At block 2611, a determination may be made as to whether a VLAN_ID of the frame is equal to a VLAN_ID associated with the VN_Port. If the condition at block 2611 is not met, then the method 2600 may proceed to block 2615, where the frame may be discarded. Otherwise, the method 2600 may proceed to block 2613, where a determination may be made as to whether the Domain_ID in the D_ID of the frame matches an entry in a Domain_Key Table, such as the Domain_Key Table 1300. If the condition of block 2613 is not met, then the method 2600 may proceed to block 2615, where the frame may be discarded and the method 2600 may end. Otherwise, the method 2600 may proceed to block 2614, where a Domain_Key may be obtained from the Domain_Key Table.

The method 2600 may then proceed to block 2616, where a determination may be made as to whether the short D_ID matches an entry in a Destination Station Table, such as the Destination Station Table 1500. If a matching entry is not found in the Destination Station Table, then the destination VN_Port with the FCID equal to the D_ID may not exist or be registered. As such, the method 2600 may proceed to block 2615, where the frame may be discarded and the method 2600 may end. Otherwise, the method 2600 may proceed to block 2618, where the VSAN_ID, the destination CPC-MAC address, the port ID (e.g. Out_Port_ID) and an Out_VLAN_ID associated with the D_ID, and the SP Flag may be obtained from the Destination Station Table using the short D_ID. The method 2600 may then proceed to block 2670, where the received FC frame may be encapsulated, for instance using a format similar to the FCoE frame format 1700. For instance, the frame may be encapsulated and forwarded using procedures similar to those described in block 2570. In addition, the VN_Port MAC field in the FCoE Frame Format 1700 may be filled by the DMAC of the frame if the obtained SP flag is set to about one. The frame may then be forwarded to the ESF.

In embodiments, the FCoE switch operating in NPV mode may receive FCoE frames from the ESF in the egress direction. For instance, the received frame may comprise an L flag equal to about one when the egress port is configured as a VF_Port or F_Port. Alternatively, the frame may comprise an L flag equal to about zero when the egress port is configured as an N_Port or VN_Port. If the egress port is VF_Port/F_Port, the FCoE switch may process the received frame in a similar way to the non-NPV mode. The pseudo-code for such a process is shown below.

```
if ((output_port == FCoE) && (port_type == VF_Port)) {          # FCoE port #
    if (VN_Port MAC field 1700 is not empty) {
        DMAC = VN_Port MAC field;
    }
    else {
        if (address mode == FPMA) {         #SP flag = 0#
            DMAC=destination VN_Port MAC;          # VN_Port MAC = MAP + D_ID #
        }
        else {                  # SPMA #
            find a destination VN_Port MAC via lookup of VN_Port MAC Table;
            if (a VN_Port MAC is not found) {
                discard the frame and stop;
            }
        }
    }
    construct a new FCoE frame with DMAC, SMAC=FCF-MAC(k,h) and VLAN_ID equals VLAN_ID
    associated with the VF_Port;             # VLAN_ID is used if Q-tag is enabled for FCoE frames #
}
else if ((output_port == FC) && (port_type == F_Port)) {          # FC port #
    construct a new FC frame from the FCoE frame;          # remove the VFT_header if any #
}
else {           # invalid port type #
    discard the frame;
}
```

If the egress port is VN_Port/N_Port, the FCoE switch may process the received frame using a plurality of procedures, such as those described in the pseudo-code below.

```
if ((output_port == FCoE) && (port_type == VN_Port)) { # FCoE
port #
    if (address mode == FPMA) {             #SP flag = 0#
        SMAC = MAP + S_ID;
    }
    else {
        SMAC = VN_Port MAC in 1700;
    }
    construct a new FCoE frame with DMAC=remote FCF-MAC, SMAC,
    VLAN ID equals the VLAN_ID associated with the remote
    FCF-MAC;           # if Q-tag is used between the FCoE switch
    VN_Port and the remote FCF-MAC#
else if ((output_port == FC) && (port_type == N_Port))
{            # FC port #
    construct a new FC frame from the FCoE frame;
}
else {             # invalid port type #
    discard the frame;
}
```

In another embodiment, when a server-facing port of an FCoE switch in the NPV mode may support more than one VLAN_ID, a VLAN_ID item in the Source Station Table 1400 and the Destination Station Table 1500 may be required. The use of this item is similar to that for the FCoE switch in non-NPV mode.

In some cases, the CPC or FCoE switch may receive an FCoE or FC frame comprising network control and/or management information that may be destined to a CPU coupled to the switch. For instance, the frame may comprise an Ethertype equal to an FIP value that indicates an FIP control function, or a D_ID equal to a known address or to the Domain Controller ID of the switch. Hence, the CPC or switch may forward the frame to the CPU, for instance via a PCI/PCIe bus, or to the ESF, which may in turn forward the frame to the CPU via the PCI/PCIe bus. Further, the CPC or switch may encapsulate the received frame based on an internal frame format before forwarding.

In the case of direct CPU frame forwarding, the CPC may modify the received frame. Specifically, the CPC may replace the DMAC of the frame by the DMAC of the CPU and keep the SMAC of the frame intact. Additionally, the CPC may add additional information to the frame before forwarding the frame. The additional information may provide better frame processing for the CPU, and may include information about the ingress port of the forwarded frame. In an embodiment, if the received frame destined to the CPU is an FC frame, then the CPC may generate a new FCoE frame from the received frame, replace the DMAC of the FCoE frame with the DMAC of the CPU, add the additional information to the frame, and then forward the frame to the CPU. The CPU may then receive the frame and use the additional information, e.g. incoming port information, to determine whether the frame was sent from an FCoE port or FC port. If the frame was sent from an FCoE port, then the CPU may associate the SMAC (and S_ID) of the frame with the incoming port. Alternatively, if the frame was sent from an FC port, then the CPU may associate the S_ID of the frame with the incoming port. Further, in the case of incoming FCoE ports, the frames may be forwarded and processed with MAC learning.

When a CPU sends a frame to a remote destination, such as an FCoE frame or an FIP frame, to a remote destination, the CPU may add to the frame information about the outgoing (egress) port. If the outgoing port is an FCoE port, then the CPC may receive the frame and remove the information about the outgoing port from the frame. The CPC may also replace the SMAC of the FCoE frame with the FCF-MAC before forwarding the frame. If the outgoing port is an FC port, then the CPC may generate an FC frame from the FCoE frame and forward the FC frame.

In the case of indirect CPU frame forwarding, the CPC may process the received frame similar to the case of direct CPU frame forwarding. However, the CPC may forward the received frame to the ESF instead of the CPU. In turn, the ESF may forward the frame to the CPU based on the DMAC of the frame, which may be equal to the CPU's MAC address. When the CPU sends a frame to a remote destination, the format of the frame may be similar to the case of direct CPU frame forwarding. For instance, the CPU may add to the frame similar information about the outgoing port. If the outgoing port is an FCoE port, then the CPC may remove the information about the outgoing port from the frame and replace the SMAC of the FCoE frame with the FCF-MAC. If the outgoing port is an FC port, then the CPC may generate an FC frame from the FCoE frame and forward the FC frame.

The procedures in the blocks described herein may be implemented in any appropriate sequence, which may be different than the sequence above. At least one of the procedures may also be implemented in parallel to increase the processing speed and/or optimize the frame forwarding methods.

Figure 25:
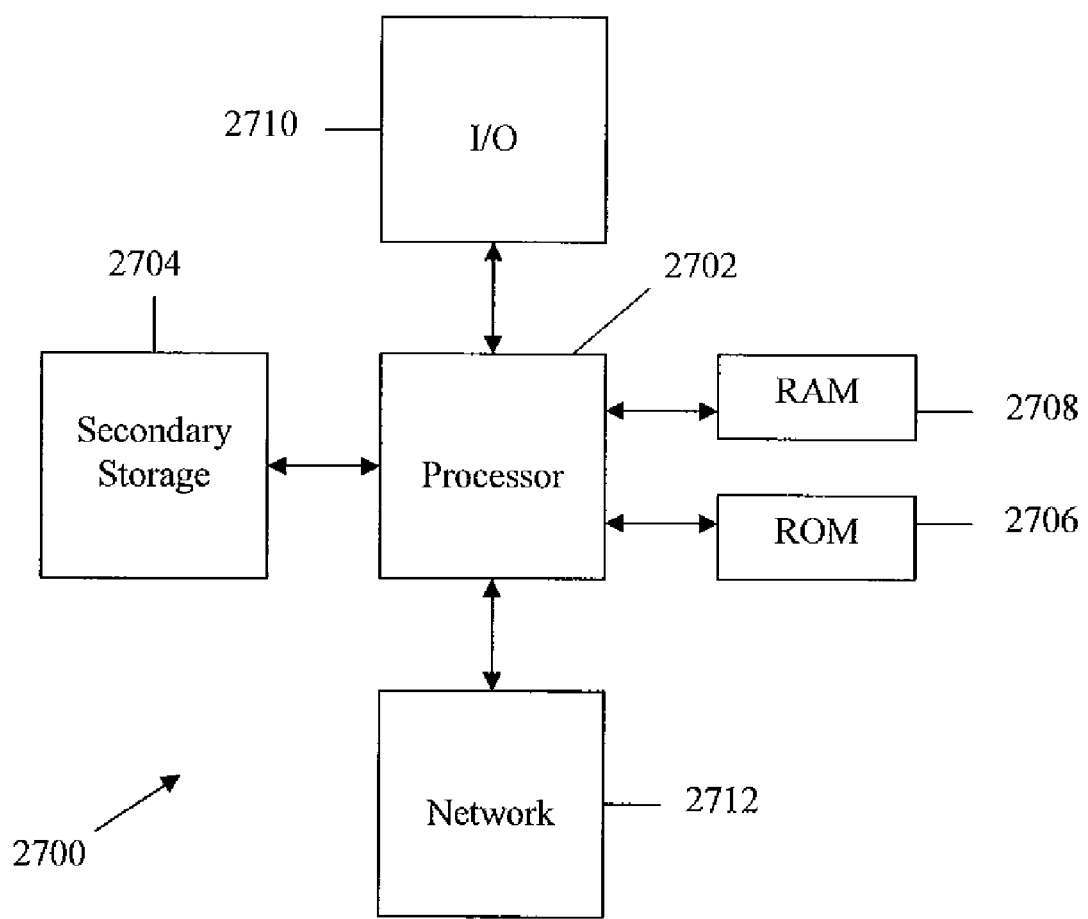
FIG. 25 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 25 illustrates a typical, general-purpose network component 2700 suitable for implementing one or more embodiments of the components disclosed herein. The network component 2700 includes a processor 2702 (which may be referred to as a CPU) that is in communication with memory devices including secondary storage 2704, read only memory (ROM) 2706, random access memory (RAM) 2708, input/output (I/O) devices 2710, and network connectivity devices 2712. The processor 2702 may be implemented as one or more CPU chips, or may be part of one or more application specific integrated circuits (ASICs).

The secondary storage 2704 is typically comprised of one or more disk drives or tape drives and is used for non-volatile storage of data and as an over-flow data storage device when RAM 2708 is not large enough to hold all working data. Secondary storage 2704 may be used to store programs that are loaded into RAM 2708 when such programs are selected for execution. The ROM 2706 is used to store instructions and perhaps data that are read during program execution. ROM 2706 is a non-volatile memory device that typically has a small memory capacity relative to the larger memory capacity of secondary storage 2704. The RAM 2708 is used to store volatile data and perhaps to store instructions. Access to both ROM 2706 and RAM 2708 is typically faster than to secondary storage 2704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   an Ethernet Switch Fabric (ESF);
   a first Converged Port Controller (CPC) comprising a first port, a second port, and a plurality of third ports, wherein at least some of the plurality of third ports are coupled to the ESF, and wherein the CPC is configured to:
      receive a first plurality of Fiber Channel over Ethernet (FCoE) frames on the first port and a plurality of Fiber Channel (FC) frames on the second port;
      modify the first plurality of FCoE frames to produce modified FCoE frames;
      encapsulate the plurality of FC frames into an Ethernet format to produce a second plurality of FCoE frames;
      transmit the modified FCoE frames and the second plurality of FCoE frames to the ESF on the third ports; and
   a second CPC coupled to the ESF and configured to:
      receive the modified FCoE frames and the second plurality of FCoE frames from the ESF;
      decapsulate the second plurality of FCoE frames to reproduce the plurality of FC frames;
      change the modified FCoE frames to produce a third plurality of FCoE frames; and
      transmit the plurality of FC frames and the third plurality of FCoE frames.

2. An apparatus comprising:
   an Ethernet Switch Fabric (ESF);
   a Fiber Channel over Ethernet (FCoE) Converged Port Controller (CPC) comprising a first port and a second port, wherein the second port is coupled to the ESF, and wherein the FCoE CPC is configured to:
      receive a first plurality of FCoE frames on the first port;
      modify the first plurality of FCoE frames to produce modified FCoE frames; and
      transmit the modified FCoE frames to the ESF via the second port; and
   a Fiber Channel (FC) CPC comprising a third port and a fourth port, wherein the fourth port is coupled to the ESF, and wherein the FC CPC is configured to:
      receive a plurality of FC frames on the third port;
      encapsulate the plurality FC frames into an Ethernet format to produce a second plurality of FCoE frames; and
      transmit the second plurality of FCoE frames to the ESF via the fourth port.

3. The apparatus of claim 2, wherein any standard Ethernet frames received on the first port or the third port are sent to the ESF without modification.

4. An apparatus comprising:
   a Converged Port Controller (CPC) comprising a plurality of first ports and a plurality of second ports; and
   an Ethernet Switch Fabric (ESF) coupled to at least one of the second ports,
   wherein the CPC is configured to receive a plurality of Fiber Channel over Ethernet (FCoE) frames on the first ports, modify at least some of the FCoE frames, thereby producing modified FCoE frames, and transmit the FCoE frames on the second ports,
   wherein each of the second ports is assigned a unique CPC Media Access Control (MAC) address associated with a Virtual Local Area Network Identifier (VLAN_ID), and
   wherein each of the first ports is assigned a unique global Fiber Channel Forwarder (FCF) MAC address.

5. An apparatus comprising:
   a Converged Port Controller (CPC) comprising a first port and a second port; and
   an Ethernet Switch Fabric (ESF) comprising a conventional Ethernet switch that is coupled to the second port, wherein the conventional Ethernet switch does not support Fiber Channel over Ethernet (FCoE) processing,
   wherein the CPC is configured to:
      receive a first plurality of FCoE frames on the first port;
      modify the first plurality of FCoE frames to produce modified FCoE frames,
   wherein the modified FCoE frames are in a format that is supported by the conventional Ethernet switch; and
      transmit the modified FCoE frames to the conventional Ethernet switch via the second port, and
   wherein the apparatus is configured to operate in an N_Port Virtualizer (NPV) mode, and wherein the apparatus is configured to assign a Server Provided MAC Address (SPMA) VN_MAC address if one of the server-facing ports is a VF_Port and one of the network-facing ports is N_Port.

6. An apparatus comprising:
   a Converged Port Controller (CPC) comprising a first port, a second port, and a plurality of front-facing ports and a plurality of internal ports, wherein the first port is one of the plurality of front-facing ports and the second port is one of the plurality of internal ports, and wherein the first port is associated with the second port and at least one of the other internal ports; and
   an Ethernet Switch Fabric (ESF) comprising a conventional Ethernet switch that is coupled to the second port, wherein the conventional Ethernet switch does not support Fiber Channel over Ethernet (FCoE) processing, and
   wherein the CPC is configured to:
      receive a first plurality of FCoE frames on the first port;
      modify the first plurality of FCoE frames to produce modified FCoE frames,
   wherein the modified FCoE frames are in a format that is supported by the conventional Ethernet switch; and
      transmit the modified FCoE frames to the conventional Ethernet switch via the second port.

7. A method comprising:
   receiving a first plurality of Fiber Channel over Ethernet (FCoE) frames and a plurality of Fiber Channel (FC) frames;

modifying the first plurality of FCoE frames to produce a first plurality of modified FCoE frames;
encapsulating the plurality of FC frames into an Ethernet format to produce a second plurality of FCoE frames;
modifying the second plurality of FCoE frames to produce a second plurality of modified FCoE frames; and
switching the first plurality of modified FCoE frames and the second plurality of modified FCoE frames using a conventional Ethernet switch, wherein the conventional Ethernet switch does not support FCoE processing, and wherein the first plurality of modified FCoE frames and the second plurality of modified FCoE frames are in a format that is supported by the conventional Ethernet switch.

8. The method of claim 7, wherein the first plurality of FCoE frames are received on a VF_Port, a VE_Port, a VN_Port, or combinations thereof, and wherein the plurality of FC frames are received on an F_Port, an E_Port, an N_Port, or combinations thereof.

9. The method of claim 7, wherein the conventional Ethernet switch does not support FC processing.

10. The method of claim 7 further comprising accessing a Source Station Table, a Switch_ID Table, a Destination Station Table, a Remote Switch Table, or combinations thereof.

11. The method of claim 10 further comprising accessing a VN_Port MAC Table, a Remote Switch MAC Table, or both.

12. The method of claim 7, wherein each of the first plurality of FCoE frames comprise a first destination media access control (DMAC) address and a first source media access control (SMAC) address, and
wherein modifying the first plurality of FCoE frames comprises:
replacing the first DMAC address with a second DMAC address corresponding to a first server facing port, wherein the first plurality of modified FCoE frames are sent to the conventional Ethernet compatible switch over the first server facing port; and
replacing the first SMAC address with a second SMAC address corresponding to a first network facing port, wherein the first plurality of FCoE frames were received on the first network facing port.

13. The method of claim 7, wherein each of the second plurality of FCoE frames comprise a third DMAC address and a fourth SMAC address, and
wherein modifying the second plurality of FCoE frames comprises:
replacing the third DMAC address with a fourth DMAC address corresponding to a second server facing port, wherein the second plurality of modified FCoE frames are sent to the conventional Ethernet compatible switch over the second server facing port; and
replacing the third SMAC address with a fourth SMAC address corresponding to a second network facing port, wherein the plurality of FC frames were received on the second network facing port.

14. The method of claim 7, wherein the first plurality of FCoE frames comprise a virtual Fabric Tag header (VFT_header) are received on a VE_port, and wherein the method further comprises:
identifying a virtual storage area network (VSAN) identifier (VSAN_ID) in the VFT_header of at least one of the first plurality of FCoE frames, wherein the VSAN_ID is associated with an egress port; and
subsequent to modifying the first plurality of FCoE frames, sending the first plurality of modified FCoE frames to the conventional Ethernet switch via the egress port.

15. The method of claim 7, wherein the plurality of FC frames comprise a virtual Fabric Tag header (VFT_header) and are received on an F_port, and wherein the method further comprises:
identifying a virtual storage area network (VSAN) identifier (VSAM_ID) in the VFT_header of at least one of the plurality of FC frames, wherein the VSAN_ID is associated with an egress port; and
subsequent to modifying the second plurality of FCoE frames, sending the second plurality of modified FCoE frames to the conventional Ethernet switch via the egress port.

16. An apparatus comprising:
a first network facing port configured to receive a first plurality of Fiber Channel (FC) frames;
a first server facing port coupled to a conventional Ethernet Switch Fabric (ESF), wherein the conventional ESF is not capable of processing Fiber Channel over Ethernet (FCoE) frames; and
an FCoE compatible switch coupled to the first network facing port and the first server facing port, wherein the FCoE compatible switch is configured to:
encapsulate the first plurality of FC frames to produce a first plurality of FCoE frames;
modify the first plurality of FCoE frames to produce a first plurality of modified FCOE frames, wherein the first plurality of modified FCoE frames comprise a format that is supported by the conventional ESF; and
send the first plurality of modified FCoE frames to the conventional ESF via the first server facing port.

17. The apparatus of claim 16, wherein conventional ESF is not capable of processing FC frames, and wherein the FCoE is configured to operate in an N_Port Virtualizer (NPV) mode.

18. The apparatus of claim 16 further comprising a second server facing port coupling the FCoE compatible switch to an FCoE compatible device,
wherein the first network facing port is configured to receive a second plurality of FC frames; and
wherein the FCoE compatible switch is further configured to:
encapsulate the second plurality of FC frames to produce a second plurality of FCoE frames; and
send the second plurality of FCoE frames to the FCoE compatible device via the second server facing port without modifying the second plurality of FCoE frames.

19. The apparatus of claim 16 further comprising a second server facing port coupling the FCoE compatible switch to an FC compatible device,
wherein the first network facing port is configured to receive a second plurality of FC frames; and
wherein the FCoE compatible switch is further configured to send the second plurality of FC frames to the FC compatible device via the second server facing port without modifying the second plurality of FC frames.

20. The apparatus of claim 16 further comprising:
a second network facing port configured to receive a second plurality of FCoE frames; and
a second server facing port, wherein the FCoE compatible switch is coupled to the second network facing port and the second server facing port, and wherein the FCoE compatible switch is configured to:
modify the second plurality of FCoE frames to produce a second plurality of modified FCoE frames; and
send the second plurality of modified FCoE frames to the conventional ESF via the second server facing port.

21. The apparatus of claim 16, wherein the second server facing port is coupled to the conventional ESF, and
wherein the FCoE compatible switch is further configured to:
modify the second plurality of FCoE frames to produce a second plurality of modified FCoE frames; and
send the second plurality of modified FCoE frames to the conventional ESF via the second server facing port.

22. The apparatus of claim 16, wherein each of the first plurality of FCoE frames comprise a first destination media access control (DMAC) address and a first source media access control (SMAC) address, and wherein modifying the first plurality of FCoE frames comprises:
replacing the first DMAC address with a second DMAC address, wherein the second DMAC address corresponds to the first server facing port; and
replacing the first SMAC address with a second SMAC address, wherein the second SMAC address corresponds to the first network facing port.

23. An apparatus comprising:
a Converged Port Controller (CPC) comprising a first port and a second port; and
an Ethernet Switch Fabric (ESF) comprising a conventional Ethernet switch that is coupled to the second idea, wherein the conventional Ethernet switch does not support Fiber Channel over Ethernet (FCoE) processing,
wherein the CPC is configured to:
receive a first plurality of FCoE frames on the first port;
modify the first plurality of FCoE frames to produce modified FCoE frames,
wherein the modified FCoE frames are in a format that is supported by the conventional Ethernet switch; and
transmit the modified FCoE frames to the conventional Ethernet switch via the second port, and
wherein each of the first plurality of FCoE frames comprise a first destination media access control (DMAC) address and a first source media access control (SMAC) address, and wherein modifying the first plurality of FCoE frames comprises:
replacing the first DMAC address with a second DMAC address, wherein the second DMAC address corresponds to the second port; and
replacing the first SMAC address with a second SMAC address, wherein the second SMAC address corresponds to the first port.

24. An apparatus comprising:
a Converged Port Controller (CPC) comprising a first port and a second port; and
an Ethernet Switch Fabric (ESF) comprising a conventional Ethernet switch that is coupled to the second idea, wherein the conventional Ethernet switch does not support Fiber Channel over Ethernet (FCoE) processing,
wherein the CPC is configured to:
receive a first plurality of FCoE frames on the first port;
modify the first plurality of FCoE frames to produce modified FCoE frames,
wherein the modified FCoE frames are in a format that is supported by the conventional Ethernet switch; and
transmit the modified FCoE frames to the conventional Ethernet switch via the second port, and
wherein the first port is a VE_port,
wherein the first plurality of FCoE frames comprise a virtual Fabric Tag header (VFT_header) comprising a virtual storage area network (VSAN) identifier (VSAN_ID), and
wherein the VSAN_ID is an associated second port.

25. An apparatus comprising:
a symmetric Converged Port Controller (CPC) comprising a plurality of first ports and a plurality of second ports, wherein the symmetric CPC comprises the same quantity of first ports and second ports, and wherein each of the first ports is associated with only one of the second ports;
an Ethernet Switch Fabric (ESF) comprising a conventional Ethernet switch that is coupled to the second port, wherein the conventional Ethernet switch does not support Fiber Channel over only Ethernet frames; and
a Fiber Channel (FC) CPC comprising a third port and a fourth port, wherein the fourth port is coupled to the ESF, and wherein the FC CPC is configured to receive a plurality of FC frames on the third port, encapsulate the plurality FC frames into an Ethernet format to produce a second plurality of FCoE frames, and transmit the second plurality of FCoE frames to the ESF via the fourth port,
wherein the symmetric CPC is configured to:
receive FCoE frames on one of the plurality of first ports;
modify the FCoE frames to produce modified FCoE frames; and transmit the modified FCoE frames to the ESF via one of the second ports that is coupled to the ESF.

* * * * *

UNITED STATES PATENT AND TRADEMARK OFFICE
CERTIFICATE OF CORRECTION

PATENT NO.       : 8,369,347 B2
APPLICATION NO.  : 12/559194
DATED            : February 5, 2013
INVENTOR(S)      : Yinjun Xiong et al.

It is certified that error appears in the above-identified patent and that said Letters Patent is hereby corrected as shown below:

In the Claims

Column 32 Line 1 - Claim 15 should read as follows:

15. The method of claim 7, wherein the plurality of FC frames comprise a virtual Fabric Tag header (VFT_header) and are received on an F_port, and wherein the method further comprises: identifying a virtual storage area network (VSAN) identifier (VSAN_ID) in the VFT_header of at least one of the plurality of FC frames, wherein the VSAN_ID is associated with an egress port; and subsequent to modifying the second plurality of FCoE frames, sending the second plurality of modified FCoE frames to the conventional Ethernet switch via the egress port.

Column 33 Line 21 - Claim 23 should read as follows:

23. An apparatus comprising:
a Converged Port Controller (CPC) comprising a first port and a second port; and
an Ethernet Switch Fabric (ESF) comprising a conventional Ethernet switch that is coupled to the second port, wherein the conventional Ethernet switch does not support Fiber Channel over Ethernet (FCoE) processing, wherein the CPC is configured to:
receive a first plurality of FCoE frames on the first port;
modify the first plurality of FCoE frames to produce modified FCoE frames,
wherein the modified FCoE frames are in a format that is supported by the conventional Ethernet switch; and
transmit the modified FCoE frames to the conventional Ethernet switch via the second port, and wherein each of the first plurality of FCoE frames comprise a first destination media access control (DMAC) address and a first source media access control (SMAC) address, and wherein modifying the first plurality of FCoE frames comprises:
replacing the first DMAC address with a second DMAC address, wherein the second DMAC address corresponds to the second port; and
replacing the first SMAC address with a second SMAC address, wherein the second SMAC address Signed and Sealed this
Tenth Day of June, 2014

Michelle K. Lee
*Deputy Director of the United States Patent and Trademark Office* corresponds to the first port.

Column 34 Line 1 - Claim 24 should read as follows:

24. An apparatus comprising:
a Converged Port Controller (CPC) comprising a first port and a second port; and
an Ethernet Switch Fabric (ESF) comprising a conventional Ethernet switch that is coupled to the second port, wherein the conventional Ethernet switch does not support Fiber Channel over Ethernet (FCoE) processing,
wherein the CPC is configured to:
receive a first plurality of FCoE frames on the first port;
modify the first plurality of FCoE frames to produce modified FCoE frames,
wherein the modified FCoE frames are in a format that is supported by the conventional Ethernet switch; and
transmit the modified FCoE frames to the conventional Ethernet switch via the second port, and
wherein the first port is a VE_port,
wherein the first plurality of FCoE frames comprise a virtual Fabric Tag header (VFT_header) comprising a virtual storage area network (VSAN) identifier (VSAN_ID), and
wherein the VSAN_ID is an associated second port.

Column 34 Line 22 - Claim 25 should read as follows:

25. An apparatus comprising:
a symmetric Converged Port Controller (CPC) comprising a plurality of first ports and a plurality of second ports,
wherein the symmetric CPC comprises the same quantity of first ports and second ports, and wherein each of the first ports is associated with only one of the second ports;
an Ethernet Switch Fabric (ESF) comprising a conventional Ethernet switch that is coupled to the second port,
wherein the conventional Ethernet switch does not support Fiber Channel over Ethernet (FCoE) processing, and
wherein the conventional Ethernet switch is configured to process only Ethernet frames; and
a Fiber Channel (FC) CPC comprising a third port and a fourth port, wherein the fourth port is coupled to the ESF, and wherein the FC CPC is configured to receive a plurality of FC frames on the third port, encapsulate the plurality FC frames into an Ethernet format to produce a second plurality of FCoE frames, and transmit the second plurality of FCoE frames to the ESF via the fourth port,
wherein the symmetric CPC is configured to:
receive FCoE frames on one of the plurality of first ports;
modify the FCoE frames to produce modified FCoE frames; and transmit the modified FCoE frames to the ESF via one of the second ports that is coupled to the ESF.